US006850874B1

(12) United States Patent
Higuerey et al.

(10) Patent No.: US 6,850,874 B1
(45) Date of Patent: *Feb. 1, 2005

(54) METHOD AND APPARATUS FOR PREDICTING A CHARACTERISTIC OF A PRODUCT ATTRIBUTE FORMED BY A MACHINING PROCESS USING A MODEL OF THE PROCESS

(75) Inventors: Evelitsa E. Higuerey, Middletown, CT (US); Aaron L. Schweizerhof, Middletown, CT (US)

(73) Assignee: United Technologies Corporation, Hartford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1956 days.

(21) Appl. No.: 09/061,644
(22) Filed: Apr. 17, 1998
(51) Int. Cl.⁷ .................................................. G06G 7/48
(52) U.S. Cl. .............................................. 703/4; 703/6
(58) Field of Search ...................... 395/500.27, 500.25; 703/4, 6

(56) References Cited

U.S. PATENT DOCUMENTS

| | | | | |
|---|---|---|---|---|
| 3,860,779 A | * | 1/1975 | Marendaz ................ 219/69.16 |
| 4,510,365 A | * | 4/1985 | MacGregor et al. ..... 219/69.16 |
| 4,725,705 A | * | 2/1988 | Holland-Moritz ........ 219/69.17 |
| 5,010,224 A | * | 4/1991 | Shirey et al. ............ 219/69.17 |
| 5,034,106 A | | 7/1991 | Nyberg .................... 204/129.2 |
| 5,062,066 A | | 10/1991 | Scher et al. |
| 5,121,467 A | | 6/1992 | Skeirik ......................... 395/11 |
| 5,181,177 A | * | 1/1993 | Bond et al. .................. 700/162 |
| 5,267,141 A | * | 11/1993 | Morita et al. ................. 700/32 |
| 5,282,261 A | | 1/1994 | Skeirik |
| 5,286,947 A | | 2/1994 | Clyde et al. ........... 219/121.83 |
| 5,294,308 A | | 3/1994 | Asaoka et al. |
| 5,360,957 A | * | 11/1994 | Haefner et al. .......... 219/69.16 |
| 5,369,870 A | * | 12/1994 | Ouchi et al. ................... 29/558 |
| 5,388,186 A | | 2/1995 | Bose ........................... 395/11 |
| 5,399,229 A | | 3/1995 | Stefani et al. ............... 156/626 |
| 5,428,201 A | | 6/1995 | Kaneko et al. |
| 5,495,430 A | | 2/1996 | Matsunari et al. .......... 364/578 |
| 5,523,953 A | * | 6/1996 | Araie et al. ................. 700/193 |
| 5,526,293 A | | 6/1996 | Mozumder et al. ......... 364/578 |
| 5,571,426 A | | 11/1996 | Akemura |
| 5,649,063 A | | 7/1997 | Bose ........................... 395/22 |
| 5,653,894 A | | 8/1997 | Ibbotson et al. .............. 216/59 |
| 5,654,903 A | | 8/1997 | Reitman et al. |
| 5,664,066 A | | 9/1997 | Sun et al. ..................... 395/23 |
| 5,831,407 A | * | 11/1998 | Ouchi et al. ................ 318/567 |

FOREIGN PATENT DOCUMENTS

| | | |
|---|---|---|
| DE | 195 12 291 | 9/1995 |
| EP | 0 009 928 | 6/1983 |
| EP | 677 352 | 4/1995 |
| EP | 659 513 | 6/1995 |
| WO | WO 94/17391 | 8/1994 |

OTHER PUBLICATIONS

"Study on modeling of wire EDM process", by T. A. speeding and Z.Q. Wang, Journal of Materials Processing Technology, vol./Iss. V69n1–3, Sep., 1997, pp. 18–28.

(List continued on next page.)

*Primary Examiner*—Hugh Jones

(57) ABSTRACT

The present invention includes at least one sensor that senses the characteristic of one or more parameters associated with a stochastic machining process and provides one or more measurement signals indicative thereof, and further includes a signal processor having a model indicative of a correspondence between the characteristic of the parameters associated with the stochastic machining process and the characteristic of the resulting product attribute, and uses the model to generate a signal indicative of the predicted characteristic of the attribute of the product.

49 Claims, 17 Drawing Sheets

OTHER PUBLICATIONS

"Parametric optimization and surface characterization of wire electrical discharge machining process", T. A. Spedding and Z. Q. Wang, Precision Engineering, 1997, pp. 5–15.

"Pre–Production Results Demonstrating Multiple–system Models for Yield Analysis", Edward A. Ietman, Member, IEEE, David J. Friedman, and Earl R. Lory, IEEE Transactions on Semiconductor Manufacturing, vol. 10, No. 4, Nov. 1997, pp. 469–481.

"Neural Network–Based Quality Controllers for Manufacturing Systems", R. B. Chinnam and W. J. Kolarik, Int. J. Prod. Res., 1997, vol. 35, No. 9, pp. 2601–2620.

Predicting the Internal Bond Strength of Particleboard, Utilizing a Radial Basis Function Neural Network, Deborah F. Cook and Chih–Chou Chiu, Engng. Applied Artif. Intell., vol. 10, No. 2 pp. 171–177, 1997.

Electrical Discharge Machining, EDM'95, Sep. 12–14, 1995, Rosemont Expo Center, Chicago, IL, Conference Proceedings, 24 pages.

"A new EDM Adaptive Control Plan Using Self–Tuning Control Algorithm", Wang Weimin, Associate Professor, Department of Mechanical Engineering, Chengdu University of Science and Technology, Chengdu, People's Republic of China, pp. 227–233.

"Adaptive Control of EDM–Jump with Self–Tuning Approach", Wansheng Zhao and Takahisa Masuzawa, Bull, Japan Soc. Of Prec. Engg., vol., 24, No. 1, Mar. 1990, pp. 45–50.

"New Servo Control Interface and Model Reference Control for EDM", by W. M. Wang, K. P. Rajurkar, Industrial and Management Systems, Engineering Department, University of Nebraska–Lincoln, Lincoln, Nebraska 68588, pp. 281–286.

"Monitoring and Controlling the E.D.M. Process", S. K. Bhattacharyya and M. F. El–Menshawy, Manufacturing Systems Research Unit, Dept. of Engineering Production, University of Birmingham, U.K., Journal of Engineering for Industry, Aug. 1980, vol. 102, pp. 189–194.

"About the Application of Fuzzy Controllers in High–Performance Die–Sinking EDM Machines", Dipl. El.–Ing. ETHZ Marco Boccadoro*, Dr. ir. D. F. Dauw, Consultant (2), *Head of Generator and Process Control Department, Research and Development, AGIE, Losone, Switzerland, Annals of the CIRP vol. 44/1/1995, pp. 147–150.

"Adaptive Control Optimization As Basis For Intelligent EDM Die Sinking Machines", R. Snoeys, Professor and F. Staelens, Department of Mechanical Engrg, Katholieke Universiteit Leuven, Leuven, Belgium and D. Dauw, Charmilles Technologies, Geneve, Switzerland, pp. 63–77.

"Advances in EDM monitoring and Control Systems Using Modern Control Concepts", Kamlakar P. Rajurkar, Nontraditional Manufacturing Research Center, University of Nebraska–Lincoln, 175 Nebraska hall, Lincoln NE 68588–0518, USA, International Journal of Electrical Machining No. 2, Jan. 1997, pp. 1–8.

"Adaptive Control Optimization of the EDM Process Using Minicomputers", J. P. Kruth, R. Snoeys and H. Van Brussel, Katholieke universiteit Leuven, Departcment werktuig–kunde, Afdeling Werkplaatstechniek en Industrieel Beleid, Celestijnenlaan 300B, B–3030 Heverlee, Belgium, North–Holland Publishing Company, Computer in Industry 1 (1979), pp. 65–75.

"About the Application of Fuzzy Controllers in High–Performance Die–Sinking EDM Machines", by Dip. El. Ing. ETHZ, Marco Boccadoro, AGIE, Losone, Switzerland and Dr. ir D. F. Dauw, Consultant, pp. 333–340.

"Advanced Pulse Discriminating System for EDM process Analysis and Control", D. F. Dauw, R. Snoeys (1), W. Dekeyser, Annals of the CIRP vol. 32/2/1983, pp. 541–549.

"Analysis and Adaptive Control of EDM Sinking Process Using the Ignition Delay Time and Fall Time as Parameter", Prof. Dr.–Ing. M. Weck(1), WZL RWTH Aachen/Germany; Dip.–Ing. J. M. Dehmer, WZL RWTH Aachen, Annals of the CIRP vol. 41/1/1992, pp. 243–246.

"Improved Adaptive Control System for EDM Processes", R. Snoeys (1), D. Dauw, J. P. Kruth, Annals of the CIRP vol. 29/1/1980, pp. 97–101.

"An Adaptive Control Solution to the Problem of Automation and Optimization of EDM", by J. P. Kruth, Assistnat, R. Snoeys, Professor, H. Van Brussel, Ass. Professor, Katholieke universiteit Leuven, Department Werktuigkunde, Afdeling Werkplaatstechniek en Industrieel Beleid, Celestijnenlaan 300B, B–3030 Heverlee, Belgium, pp. 307–314.

"Correlation Between Electro–Discharge Machining Data and Machining Settings", R. Snoeys (1), H. Cornelissen, K. U. Leuven/B., Annals of the CIRP vol. 24/1/1975, pp. 83–88.

Identification of the Discharge Profile in E.D.M. by S. K. Bhattacharyya, Head of Manufacturing Systems Unit, University of Birmingham, u.K., P. F. El–Menshawy, Research Fellow, Manufacturing Systems Unit, University of Birmingham, U.K., pp. 351–356.

"In–Process Optimizaiton of Electro–Dishcarge Machining", Ir. J. P. Kruth, Prof. R. Snoeys, Dr. ir. H. Van Brussel, Katholieke Universiteit Leuven, Heverlee, Belgium, pp. 567–574.

"Monitoring the E.D.M. Process by Radio Signals", S. K, Bhattacharyya and M. F. El–Menshawy, Int. J. prod. Res., 1978, vol. 16, No. 5, 353–363.

"Adaptive Control of EDM–JUMP with Self–Tuning Approach", Wansheng Zhao and Takahisa Masuzawa, Bull, Japan Soc. Of the Prec. Engg., vol. 24, No. 1 (Mar. 1990), pp. 45–50.

"Real–Time Stochastic Model and Control of EDM", K. P. Rajurkas, W. M. Wang; University of Nebraska, Lincoln/USA—Submitted by R. P. Lindsay (1), Annals of the CIRP vol. 39/1/1990, pp. 187–190.

"Digital Gap Monitor and Adaptive integral Control for Auto–Jumping in EDM", W. M. Wange, K. P. Rajurkas, K. Adamatsu, Journal of Engineering for Industry, May 1995, vol. 117, pp. 253–258.

* cited by examiner

FIG.1A
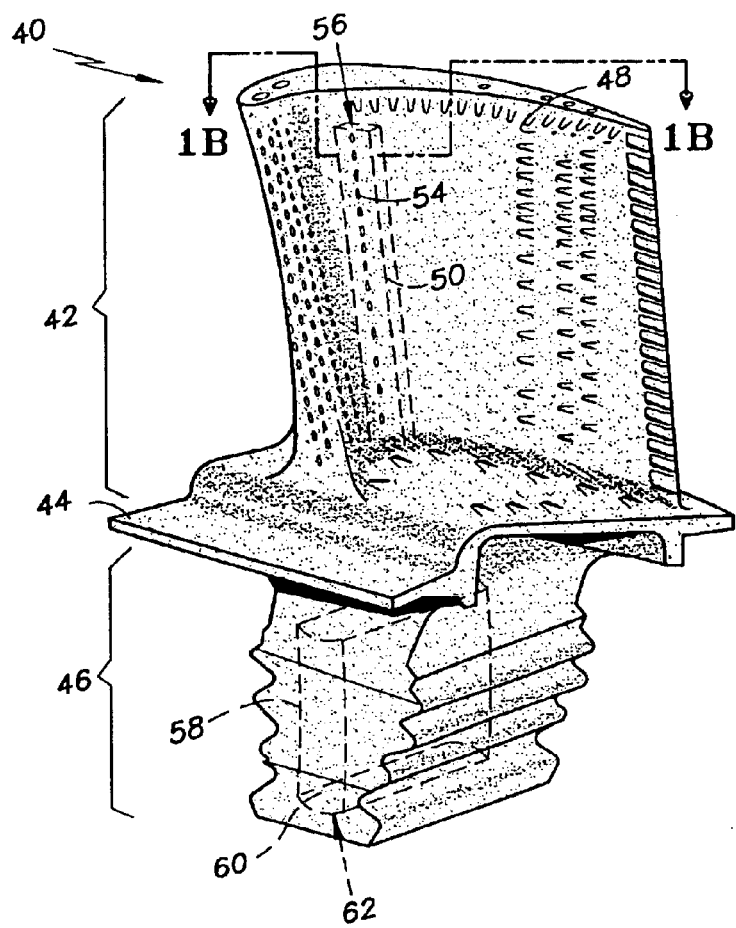
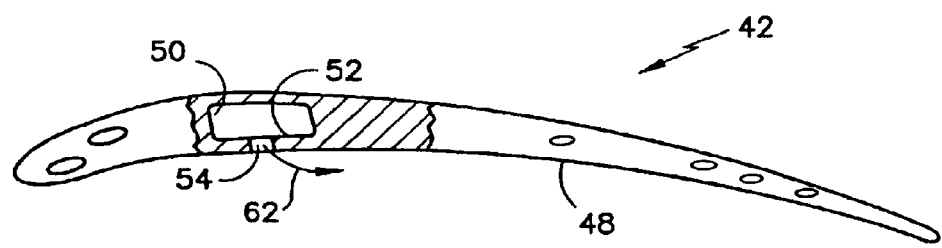
FIG.1B

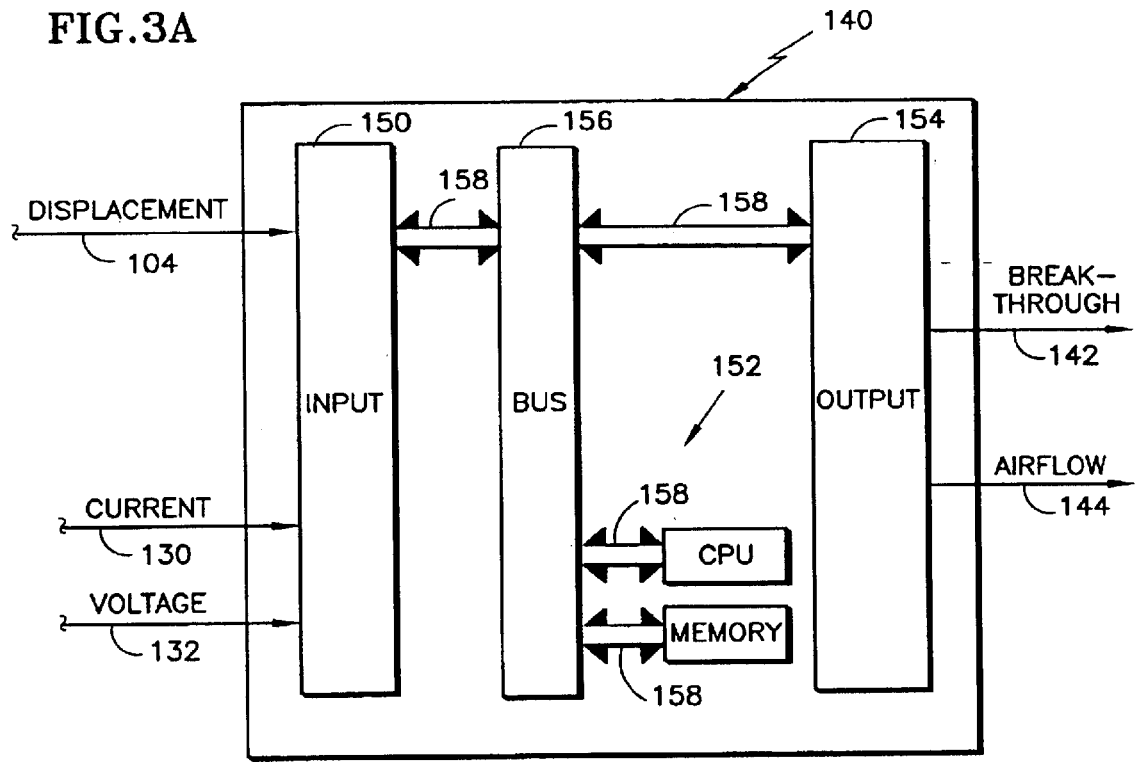
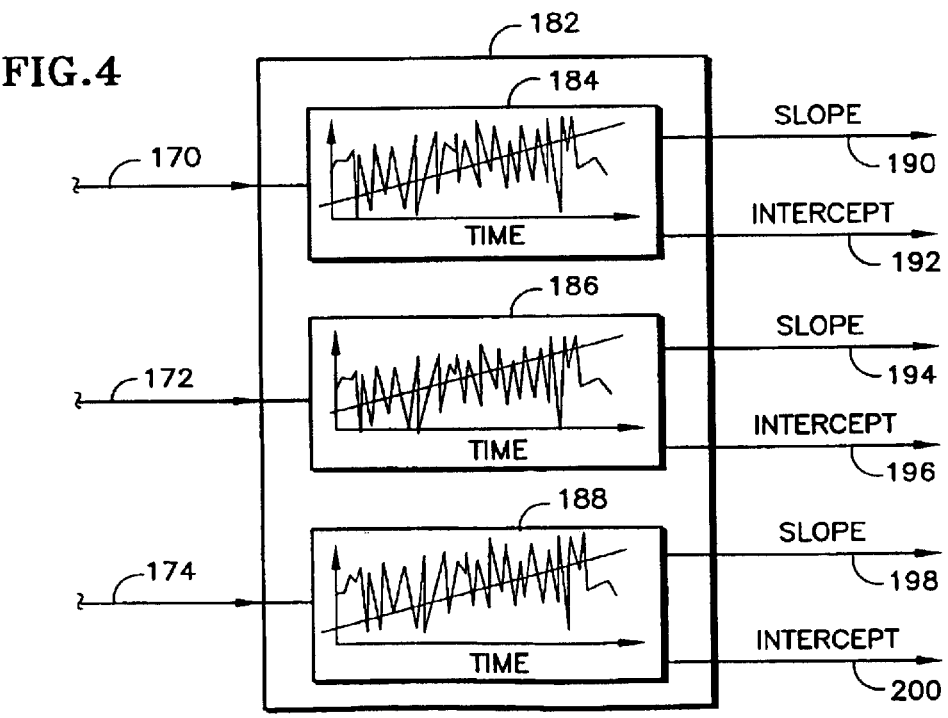

FIG.19  EDM BREAKTHROUGH PREDICTION WEIGHTS AND BIASES

| INPUTN SIGNAL → | VOLTAGE Y INT | VOLTAGE SLOPE | CURRENT Y INT | CURRENT SLOPE | DISPL Y INT | DISPLACEMENT SLOPE |
|---|---|---|---|---|---|---|
| INPUT NEURON # → | 1 | 2 | 3 | 4 | 5 | |
| HIDDEN NEURON # 1 | -0.0001 | -0.0012 | -0.0332 | -5.7628 | -0.0013 | -1.2566 |
| 2 | -0.0001 | -0.0025 | 0.0334 | -5.2674 | 0.0207 | 0.1343 |
| 3 | 0.0001 | -0.0044 | 0.0326 | 0.5215 | 0.0179 | -1.1657 |
| 4 | -0.0001 | 0.0040 | -0.0139 | -6.6266 | 0.0297 | 1.1612 |
| 5 | 0.0000 | 0.0033 | 0.0243 | -7.7741 | -0.0291 | -0.9297 |
| 6 | -0.0000 | -0.0007 | -0.0365 | 2.7832 | 0.0185 | -1.7677 |
| 7 | 0.0001 | 0.0025 | 0.0045 | 3.5843 | 0.0116 | -2.2288 |
| 8 | -0.0001 | -0.0033 | -0.0180 | -7.6906 | -0.0114 | 1.3063 |
| 9 | 0.0000 | -0.0033 | 0.0226 | -0.9974 | -0.0429 | 0.8776 |
| 10 | 0.0000 | 0.0027 | 0.0023 | -0.0800 | -0.0207 | 0.3720 |
| 11 | 0.0001 | 0.0024 | 0.0238 | 2.3470 | 0.0357 | 1.3607 |
| 12 | -0.0000 | 0.0052 | 0.0224 | -2.0232 | -0.0037 | -1.6044 |
| 13 | -0.0000 | -0.0053 | 0.0041 | -7.2360 | -0.0201 | -1.1531 |
| 14 | -0.0000 | -0.0009 | -0.0302 | 6.4667 | 0.0282 | -1.1248 |
| 15 | -0.0001 | -0.0052 | 0.0263 | 2.9174 | -0.0015 | 1.1644 |
| 16 | -0.0001 | 0.0037 | -0.0181 | 3.3466 | -0.0211 | 1.6322 |
| 17 | -0.0001 | 0.0061 | 0.0200 | -2.8162 | 0.0049 | 0.1092 |
| 18 | -0.0001 | 0.0044 | -0.0262 | -0.7625 | -0.0282 | -1.0466 |
| 19 | -0.0000 | -0.0033 | -0.0264 | 7.4991 | -0.0244 | 1.1566 |
| 20 | -0.0000 | 0.0017 | -0.0360 | -0.2297 | -0.0420 | -0.3673 |

WEIGTHS FOR CONNECTING LINKS BETWEEN
INPUT NEURONS AND HIDDEN NEURONS
ALL VALUES X1E05

| HIDDEN NEURON # | BIAS |
|---|---|
| 1 | 52.9335 |
| 2 | -137.9412 |
| 3 | -129.1566 |
| 4 | -150.4878 |
| 5 | 132.2924 |
| 6 | -64.9425 |
| 7 | -61.5356 |
| 8 | 81.8292 |
| 9 | 204.6592 |
| 10 | 132.3393 |
| 11 | -221.5166 |
| 12 | 1.6439 |
| 13 | 106.7256 |
| 14 | -118.9520 |
| 15 | -14.5449 |
| 16 | 137.1094 |
| 17 | -32.5598 |
| 18 | 192.2944 |
| 19 | 161.9299 |
| 20 | 265.0316 |

OUTPUT NEURON BIAS = -2.0067

WEIGHTS FOR CONNECTING LINKS BETWEEN HIDDEN NEURONS AND OUTPUT NEURON

| HIDDEN NEURON # | 1 | 2 | 3 | 4 | 5 | 6 | 7 |
|---|---|---|---|---|---|---|---|
| WEIGHT | -0.9685 | -12.8214 | -20.5104 | -6.1053 | -10.2833 | -8.4954 | 17.2443 |

| HIDDEN NEURON # | 8 | 9 | 10 | 11 | 12 | 13 | 14 |
|---|---|---|---|---|---|---|---|
| WEIGHT | 21.7110 | -12.6919 | -6.0926 | -4.5665 | 1.3445 | -10.6911 | -9.1677 |

| HIDDEN NEURON # | 15 | 16 | 17 | 18 | 19 | 20 |
|---|---|---|---|---|---|---|
| WEIGHT | -8.9969 | 2.7383 | -6.6493 | -2.8707 | -0.0800 | 20.9008 |

FIG. 23  EDM BREAKTHROUGH PREDICTION WEIGHTS AND BIASES

560

| INPUTN SIGNAL → | VOLTAGE Y INT | VOLTAGE SLOPE | CURRENT Y INT | CURRENT SLOPE | DISPL Y INT | DISPLACEMENT SLOPE |
|---|---|---|---|---|---|---|
| INPUT NEURON # ↓ | 1 | 2 | 3 | 4 | 5 | 6 |
| 1  | -0.0000 | -0.0006 |  0.0103 | -1.4434 | -0.0089 |  0.1343 |
| 2  | -0.0000 | -0.0012 |  0.0033 |  0.3665 | -0.0136 | -0.1989 |
| 3  |  0.0000 |  0.0012 |  0.0009 | -1.0057 | -0.0120 |  0.2389 |
| 4  |  0.0000 |  0.0010 |  0.0130 | -0.0341 |  0.0079 | -0.2808 |
| 5  | -0.0000 | -0.0005 | -0.0213 |  0.5790 | -0.0076 | -0.0592 |
| 6  |  0.0000 |  0.0007 |  0.0044 | -1.0324 |  0.0013 | -0.2945 |
| 7  |  0.0000 |  0.0018 | -0.0096 |  0.2821 |  0.0025 | -0.1829 |
| 8  |  0.0000 |  0.0007 |  0.0142 |  0.9400 |  0.0021 | -0.2543 |
| 9  |  0.0000 | -0.0000 |  0.0155 | -0.8179 | -0.0025 | -0.2240 |
| 10 |  0.0000 |  0.0014 |  0.0147 | -1.1639 |  0.0053 |  0.1703 |
| 11 | -0.0000 |  0.0021 | -0.0028 | -1.6061 |  0.0033 |  0.0458 |
| 12 |  0.0000 | -0.0008 | -0.0094 |  0.2255 | -0.0100 | -0.2918 |
| 13 | -0.0000 |  0.0005 |  0.0140 | -0.7872 | -0.0095 |  0.0675 |
| 14 | -0.0000 | -0.0001 | -0.0179 |  0.0577 | -0.0007 |  0.2350 |
| 15 |  0.0000 | -0.0017 | -0.0128 | -0.2837 | -0.0043 | -0.2231 |
| 16 |  0.0000 | -0.0014 | -0.0133 |  0.4840 | -0.0042 |  0.0412 |
| 17 |  0.0000 |  0.0002 | -0.0118 | -1.2211 | -0.0063 |  0.2332 |
| 18 |  0.0000 |  0.0002 |  0.0005 |  0.0643 |  0.0157 | -0.2380 |
| 19 |  0.0000 |  0.0018 |  0.0126 | -0.9199 |  0.0080 | -0.0383 |
| 20 |  0.0000 |  0.0002 |  0.0007 | -2.4707 | -0.0025 |  0.1828 |

WEIGTHS FOR CONNECTING LINKS BETWEEN INPUT NEURONS AND HIDDEN NEURONS

ALL VALUES X1E05

FIG.24

| HIDDEN NEURON # | BIAS |
|---|---|
| 1 | 40.7269 |
| 2 | 72.2149 |
| 3 | 64.0912 |
| 4 | -55.2903 |
| 5 | 62.2397 |
| 6 | -12.2280 |
| 7 | -5.0355 |
| 8 | -26.4862 |
| 9 | -3.5486 |
| 10 | -45.6716 |
| 11 | -16.0159 |
| 12 | 63.3863 |
| 13 | 41.7314 |
| 14 | 17.5374 |
| 15 | 36.7556 |
| 16 | 33.6450 |
| 17 | 42.8667 |
| 18 | -88.0130 |
| 19 | -55.5566 |
| 20 | 9.7254 |

FIG.26

OUTPUT HEURON BIAS = 0.5701

FIG.25

WEIGHTS FOR CONNECTING LINKS BETWEEN HIDDEN NEURONS AND OUTPUT NEURON

| HIDDEN NEURON # | 1 | 2 | 3 | 4 | 5 | 6 | 7 |
|---|---|---|---|---|---|---|---|
| WEIGHT | 0.3253 | -0.5985 | 0.5225 | 0.7058 | 0.2002 | -0.3900 | 0.6962 |

| HIDDEN NEURON # | 8 | 9 | 10 | 11 | 12 | 13 | 14 |
|---|---|---|---|---|---|---|---|
| WEIGHT | 0.1927 | 0.4754 | 0.3328 | -0.7447 | -0.6543 | 0.2910 | -0.1286 |

| HIDDEN NEURON # | 15 | 16 | 17 | 18 | 19 | 20 |
|---|---|---|---|---|---|---|
| WEIGHT | 1.3641 | 0.6087 | -0.4287 | -0.0798 | 0.1466 | 0.4420 |

METHOD AND APPARATUS FOR PREDICTING A CHARACTERISTIC OF A PRODUCT ATTRIBUTE FORMED BY A MACHINING PROCESS USING A MODEL OF THE PROCESS

TECHNICAL FIELD

The present invention relates to predicting a characteristic of an attribute of a product resulting from a stochastic machining process, e.g., electrical discharge machining, and more particularly to predicting the characteristic on the basis of one or more measured values of a plurality of process parameters employed in the machining process.

BACKGROUND

Electrical discharge machining ("EDM") is used in the manufacture of various metallic components, including for example, gas turbine engine components such as turbine airfoils. EDM uses high energy electrical discharges (i.e., sparks) between an electrode and an electrically conductive workpiece to remove material from the workpiece. The electrode is positioned near the workpiece, separated by only a small distance or gap. A dielectric fluid medium fills the gap between the electrode and the workpiece. A differential voltage of specified magnitude is applied between the electrode and the workpiece. The applied voltage causes the dielectric medium to ionize and break down. Current then starts to flow between the electrode and the workpiece and through the dielectric medium. The current causes heat to be generated at the surface of the workpiece. The heat results in a significant temperature rise and localized melting of the workpiece material. The magnitude of the differential voltage is reduced, the dielectric medium de-ionizes and the current terminates. Heat generation ceases allowing the electrode and the workpiece to cool somewhat. The molten material solidifies as it is flushed from the work area by the dielectric medium, leaving a crater in the workpiece. The crater typically has a shape corresponding with that of the electrode. The workpiece is left with a, shape complementary to that of the electrode. This process, or cycle, commonly referred to as an "on/off" cycle is repeated until material removal is complete.

EDM is particularly useful for machining intricate shapes in electrically conductive materials including cemented carbides and super tough alloys. Typically, these materials are extremely difficult to machine using conventional processes. For example, fragile workpieces can be machined using EDM without undergoing deformations. Conventional finishing operations are generally not required after EDM. One type of EDM process, commonly referred to as wire EDM, uses a small wire to machine an intricate shape into a workpiece. Another type of EDM process, commonly referred to as plunge EDM, uses an elongated electrode that machines recesses or holes in a workpiece. For example, small, deep, shaped holes can be formed in metallic objects such as gas turbine engine components.

Although EDM has been used for a number of years, EDM is a stochastic process and the mechanism, described hereinabove, by which EDM removes metal from a workpiece is complex and still under study. The complexity of the EDM process is due in part to the many factors which have an effect on the outcome of the process. These factors include the process parameters and the machining environmental conditions, together with the properties of the workpiece, the electrode, and the dielectric medium. The adequacy of the process depends on how closely the machining results compare to both the dimensional, geometrical, and functional cut requirements, and the surface finish and hardness requirements.

The important EDM process parameters include peak current, on/off cycle, voltage, polarity and flushing conditions. These parameters typically need to be optimized based on the desired output attribute of the workpiece (e.g., surface finish, recast layer conditions, hardness and stresses). The environmental conditions include temperature and humidity.

The important EDM workpiece and electrode properties include electrical conductivity, melting point, hardness, and dimensional accuracy. A workpiece with a relatively low conductivity results in increased heating and thus a faster rate of material removal. A relatively low melting point of the workpiece results in lower energy requirements for melting. An electrode with a relatively high conductivity and high melting point is, in most cases, ideal for attaining low electrode wear and fast material removal rate.

The properties of the dielectric medium include its dielectric strength, viscosity, and flow rate. The dielectric strength represents the amount of voltage required to ionize the fluid during EDM. A higher dielectric strength results in a lower fluid evaporation rate and a faster ionization/deionization process. The viscosity of the dielectric medium affects its ability to flush away debris and dissipate heat. A relatively low viscosity results in better flushing and more effective heat dissipation. A proper flow rate is needed to remove the molten particles (i.e., debris) away from the work area and to assist in the cooling and cutting processes. Debris in the work area is harmful in that it diverts energy from the workpiece and affects the material removal rate. In addition, debris in the work area can result in arcing, which interrupts the cutting cycle and harms the surface of the workpiece. Further, the presence of such debris makes the process dynamic, random, and difficult to control. This leads to incomplete machining, and damage to the tools and workpiece.

Another factor contributing to the complexity of EDM processes is the complex interaction between the factors above. For example, if the gap dimension is too large, the dielectric medium may never ionize and EDM may never take place. On the other hand, if the gap is too small, the part and the tool may weld together. Generally, a servo-mechanism is used to maintain a constant gap between the electrode and the workpiece. The effectiveness of the servo-mechanism depends on the effectiveness of the EDM parameter selection and optimization, the workpiece/tooling/dielectric fluid variations, and the effectiveness of the equipment maintenance. When the dielectric fluid is contaminated and/or poor flushing conditions exist, undesirable conditions such as arcing, fast electrode wear, and incomplete material removal may occur.

Yet another factor is variability in each of the parameters and properties above. This includes variations that occur during the EDM operation, between successive operations, from one day to the next, and workpiece/electrode/dielectric variation. Some of these are variations with time or use, while others represent supplier and manufacturing tolerances. The properties of the workpiece, dielectric fluid, and tooling are incoming elements that can vary randomly depending on the stability of their manufacturing processes.

Ultimately, such variability can have great significance on the EDM process. Because of its unpredictability, this variability is frequently not accounted for when initially selecting EDM process parameters. Regardless, the variability is often more difficult or impossible to control in a practical manner. The overall quality of the final product often depends on how well the randomly introduced variation and/or uncertainty is dealt with during the off-line adjustments and/or post-processing phase. However, off-line adjustments are typically conducted only after having generated a number of nonconforming parts.

Still further, there are human factors. For example, the process may require an operator to install the workpiece and the electrode in respective fixtures. Any error in the installation can cause mispositioning (in regard to location and/or angle) of the electrode relative to the workpiece. This mispositioning can subsequently result in improper machining.

Due to the inherent stochastic and dynamic nature of EDM processes, it is difficult to create the desired quality in the product at all times. For this reason, post inspection is usually required to check for product quality at the end of the process. The post product inspection phase can be time consuming, costly, subjective, and inaccurate.

To highlight some of the issues above, it is instructive to examine an EDM process for machining cooling passages, i.e., holes, in gas turbine engine components. A typical gas turbine engine has a compressor, a combustor, and a turbine. The compressor and turbine each have a plurality of rotating blades and stationary vanes. The engine operates at high temperatures, often well in excess of about 2750 deg F. (1508 deg C.), for increased performance and efficiency. However, direct exposure to such high temperatures detrimentally affects some turbine components, e.g., blades and vanes, potentially causing component distortion and, in extreme cases, melting.

Cooling techniques have been developed to keep the temperature of the blades and vanes within design limitations, while still operating the engine at high temperatures. For example, blades and vanes exposed to extreme temperatures are typically hollow to permit cooling fluid to flow through them. Furthermore, the outer surface of engine components are typically film cooled with cooling air from the compressor section of the engine. The cooling air typically passes through the component and out a series of small passages or holes (i.e., cooling holes), formed in the outer wall of the component. Film cooling requires less cooling air than other suitable cooling techniques, thereby minimizing the effect on the operating efficiency of the gas turbine engine.

The cooling holes in gas turbine engine components are traditionally created using a complex machining process such as, for example, an EDM process, a laser process, or a combination of the two. Two important characteristics of the cooling hole are break-through and airflow. Break-through is the condition where the cooling passages extend completely through the outer wall of the component. Airflow is a measure that defines the mass flow rate through these passages and may be expressed as a non-dimensional airflow pressure ratio.

Various factors, including each of the factors described above, can influence the quality, e.g., the break-through and airflow characteristics, of the machined passages. One factor is workpiece variation. For example, if the wall thickness varies significantly from part to part, then different cycle times, airflow, and break-through conditions may result. In addition, thicker walls result in more electrode wear and tapering, resulting in passages having a tapering cross sectional opening and undesirably higher airflow characteristics.

Electrode variations also have a direct impact on the final quality attributes of the part. Impurities in the electrodes can cause the grain structure to melt and/or fracture under high temperature conditions. Since the final EDM features reflect the characteristics of the electrode, such defects can lead to incomplete break-through and airflow variation, among others.

Further, use of a contaminated or poor quality dielectric medium has a direct impact on the metal removal rate. A lower medium quality results in a lower metal removal rate and a higher probability for process failure, including incomplete break-through and airflow variation.

Thus, the workpiece must traditionally be manually inspected after machining to determine the break-through and airflow characteristics of the machined holes. Break-through inspection involves manually probing each opening with a pin gage to ensure complete break-through. Airflow inspection involves washing the workpiece, applying wax to certain openings, and airflow testing the non-waxed openings. After inspection, the workpiece is typically heated to remove the wax.

Although a part machined using EDM may have an attribute of high quality without inspection, where the quality of the attribute must be known, the attribute must traditionally be inspected using one or more of the conventional methods described above. However, such manual inspection methods are time consuming, costly, and subject to human error. Consequently, a better method of determining the break-through and airflow characteristics is sought.

Extensive efforts have been directed to developing advanced monitoring systems to facilitate study of EDM voltage and current waveforms to differentiate normal sparks from harmful arc. Other studies have monitored the ignition delay time to study the gap voltage signals. Numerous control systems have been developed to control process parameters. Most of these systems focus in particular on maximizing material removal rate, reducing harmful arcing, and achieving greater process stability. However, none of the aforementioned systems can perform product inspection, predict a characteristic of an attribute, and/or help assure product quality at the end of the process.

U.S. Pat. No. 5,282,261 issued to Skeirik discloses a neural network process measurement and control system. The system uses real time output data from a neural network to replace a sensor or laboratory input to a controller, the network can use readily available measurements from sensors as inputs and produce predicted values of product properties as output. A historical database can be used to provide a history of sensor and laboratory measurements to the neural network. Skeirik discloses that for many products the important product properties relate to the end use of the product and not to the process conditions of the process. However, Skeirik does not disclose a system for use with an EDM process to predict the quality of the attribute produced by the process.

U.S. Pat. No. 5,654,903 issued to Reitman et al. discloses a method and apparatus for monitoring the state of an attribute of a product during the manufacturing process. The system employs an intelligent system trained in the relationship between the signatures of the manufacturing process and the product attribute as a function of time. However, Reitman et al. do not disclose a system for use with an EDM process to predict the quality of the product.

U.S. Pat. No. 5,428,201 issued to Kaneko et al. discloses a method and apparatus for controlling electric discharge machining. Kaneko et al. disclose maintaining the machining gap between the electrode and the workpiece at an essentially constant size based on a reference servo-feed voltage. Fuzzy logic or a neural network are disclosed for calculating the discharge stability. Kaneko et al. disclose that previous methods required the operator to set machining conditions such as on and off times in accordance with requirements such as the machining area of the workpiece, the machining depth, the dimensional accuracy required, and the surface roughness desired. However, this method seeks to control electric discharge machining conditions rather than actually predict product quality.

U.S. Pat. No. 5,571,426 issued to Akemura discloses a method of determining electric discharge machining conditions and an electric discharge machining controller. This method discloses establishing sets of predefined machining parameters, establishing for each set of machining parameters a set of machining data indicating relationships present during EDM among current, depth, electrode undersize, selecting two sets from the sets in accordance with a given set of predefined machining parameters, and inferring and thereupon generating machining condition data comprising machining depth values and corresponding current values for machining the workpiece to a prescribed configuration and prescribed dimensions. However, this method seeks to determine electric discharge machining conditions which minimize the time for roughing operations by reducing the maximum machining current in accordance with the machining depth, rather than actually predict product quality.

It is also known in the art to use a neural network model to predict surface roughness and surface waviness on the basis of pulse-width, the time between two pulses, the wire mechanical tension, and the wire feed speed. See "Study on Modeling of Wire EDM Process", Spedding, T.A., et al., Journal of Materials Processing Technology, vol. 69, pages 18–28, 1997; and "Parameter Optimization and Surface Characterization of Wire Electrical Discharge Machining Process", Spedding, T.A., et al., Precision Engineering, vol. 20, pages 5–15, 1997. Such models are suggested for optimization of the process parametric combinations, i.e., selecting target values to achieve a particular result. Other factors (including the workpiece material and dimensions, the cutting voltage, the ignition pulse current, and the dielectric), which may have effects on the measures of the process performance are fixed (held constant). It is suggested that further research might attempt to take more factors, such as wire, workpiece material, and workpiece height, into account as process inputs. However, there is no suggestion that these models can predict product quality.

DISCLOSURE OF THE INVENTION

An object of the present invention is to predict a characteristic of an attribute of a product, formed by a machining process, on the basis of one or more measured characteristics of one or more process parameters, utilizing a model.

An object of one embodiment of the present invention is to predict a characteristic of an attribute of a product, formed by an EDM process, on the basis of one or more measured characteristics of one or more process parameters utilized by an adaptive neural network trained in that process.

Another object of one embodiment of the present invention is to provide an artificial neural network model for use in predicting a characteristic of an attribute of a product resulting from an EDM process on the basis of a characteristic of one or more parameters associated with the process.

Another object of one embodiment of the present invention is to predict break-through and airflow characteristics of cooling holes resulting from an EDM process, to eliminate the need for manual inspection of the cooling holes upon completion of the EDM process.

Another object of one embodiment of the present invention is to provide a model that predicts the quality of an attribute resulting from an EDM process, wherein the model includes compensation for variability in process, workpiece, tool, and dielectric medium variations.

According to the present invention, an apparatus for providing an indication of a characteristic of an attribute of a product produced by a stochastic machining process includes at least one sensor that senses the characteristic of at least one parameter associated with the stochastic machining process and provides at least one measurement signal indicative thereof, and further includes a signal processor having a model indicative of a correspondence between the characteristic of the at least one parameter associated with the stochastic machining process and the characteristic of the resulting product attribute, and uses said model to generate a signal indicative of the predicted characteristic of the attribute of the product.

The present invention monitors characteristics of process parameters, and preferably, using an intelligent model, predicts characteristics of an attribute produced by the process. The model is preferably created using data sets that represent actual process inputs and outputs. Such a model is capable of learning about process randomness and unpredictability, and reacting to undesirable temporal processing conditions. Thus, unlike previous systems for use with a stochastic machining process, the present invention can predict characteristics of the resulting attribute despite workpiece and tool variations that are of an unpredictable nature. Thus the present invention can alleviate or eliminate the need for conventional inspection after machining, thereby saving time and reducing cost. One embodiment of the present invention provides a better indication of the airflow and break-through characteristics of cooling passages in gas turbine engine components than that provided by post machining manual inspection.

While neural networks models are known, up until now, it was thought that it may not be possible to completely model a stochastic machining process, such as for example, EDM. It was understood that is it not always possible to model every process no matter how complex, i.e., that it is not always possible to determine relationships between process parameters and process outputs. It was also understood that careful selection of the input parameters to the model is required. However, it has been determined that an intelligent model can completely model a stochastic machining process, such as for example, EDM, that suitable relationships exist between known process parameters and process outputs, and that an effective method to determine the relationship may use data sets that encompass actual data representing process inputs and outputs from as great of a percentage of all possible processing scenarios as is practical.

These and other objects, features and advantages of the present invention will become more apparent in the light of the following detailed description of exemplary embodiments thereof, as illustrated in the accompanying drawings.

BRIEF DESCRIPTION OF THE DRAWINGS

FIG. 1A is a partial side view illustration of a gas turbine engine blade having an airfoil with plurality of cooling passages;

FIG. 1B is a view, in the direction of 1B—1B, of the airfoil of the blade of FIG. 1A, showing a cross section of the passage and the internal cavity;

FIG. 3A is a more detailed schematic representation of a signal processor that is part of the EDM system of FIG. 2;

FIG. 4 is a stylized, simplified, schematic representation of a signal model and a process model used in the best mode embodiment of the present invention;

FIG. 10 is a graph illustrating the normalized differentiated magnitudes of the gap voltage and gap current parameters of an EDM process resulting in passages having complete break-through;

FIG. 12 is a graph illustrating the normalized differentiated magnitudes of the gap voltage and gap current parameters of an EDM process resulting in passages having incomplete break-through;

FIG. 19 is a graph illustrating numerical data indicative of weights associated with connecting links between input neurons and hidden neurons for the neural network that predicts break-through characteristics;

FIG. 23 is a graph illustrating numerical data indicative of weights associated with connecting links between input neurons and hidden neurons for the neural network that predicts airflow characteristics;

FIG. 24 is a graph illustrating numerical data indicative of biases associated with hidden neurons for the neural network that predicts airflow characteristics;

FIG. 25 is a graph illustrating numerical data indicative of weights associated with connecting links between hidden neurons and an output neuron for the neural network that predicts airflow characteristics; and FIG. 26 is a graph illustrating numerical data indicative of biases associated with the output neuron for the neural network that predicts airflow characteristics.

BEST MODE EMBODIMENT

Figure 2:
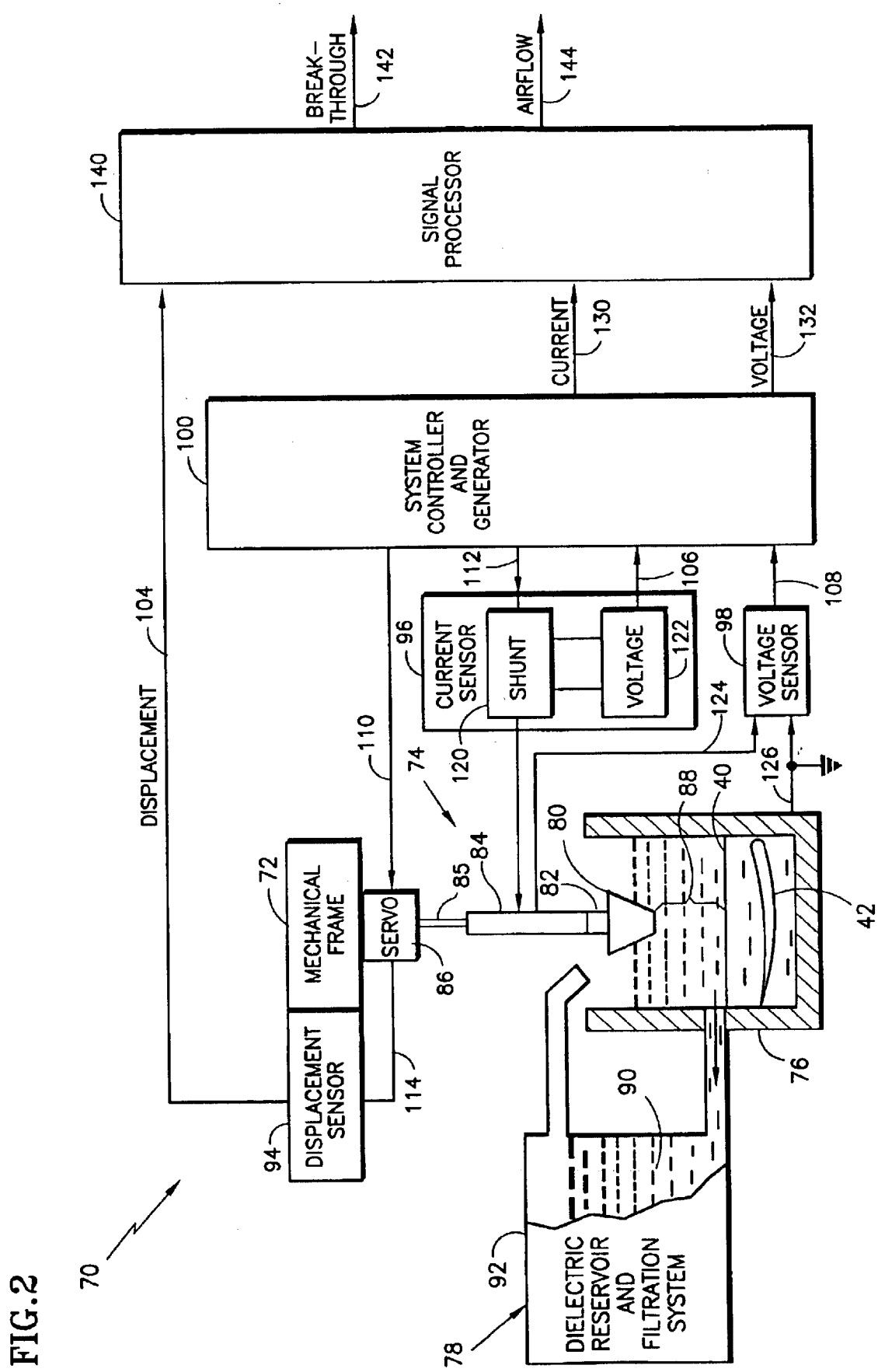
FIG. 2 is a hybrid mechanical/electrical schematic representation of an EDM system for machining the airfoil cooling passages in the blade of FIG. 1, with which the present invention may be implemented.

The present invention is directed to providing a prediction of a characteristic of an attribute resulting from a process. To accomplish this, some embodiments of the present invention may make use of artificial neural networks, although the invention is not limited to such.

The present invention is described in relation to a best mode embodiment for use in predicting break-through and airflow characteristics of cooling passages resulting from an EDM process carried out on a gas turbine engine blade of the type illustrated in FIGS. 1A, 1B. The turbine blade 40 has an airfoil 42, a platform 44, and a root 46. The airfoil 42 has an exterior surface 48, an internal cavity 50, and an interior surface 52 (FIG. 1B) bounding the internal cavity 50. The airfoil further includes a plurality of passages 54, which may be disposed in one or more rows 56 in flow communication with the internal cavity 50. The root 46 has a channel 58 (FIG. 1A) having an inlet portion 60 in flow communication, through the interior of the blade, with the internal cavity 50.

The channel 58 (FIG. 1A), the cavity 50, and the passages 54 provide a portion of a flow path 62 for cooling air. The channel (FIG. 1A) receives cooling air through the inlet 60. The cooling air flows into the internal cavity 50 of the airfoil, out the plurality of passages 54, and over the exterior surface 48 of the airfoil 42 to provide film cooling.

Because the passages 54 are part of the flow path 62 for cooling air, it is important for each of the passages 54 to possess characteristics of complete break-through, i.e., extend completely through the interior surface 52 (FIG. 1B), and enablement of suitable airflow.

Referring now to FIG. 2, an EDM system 70 for machining a row 56 (FIG. 1A) of passages 54 (FIGS. 1A, 1B) in the turbine blade 40 includes a frame 72, an electrode subsystem 74, a fixture 76 for positioning the blade 40 (i.e., the workpiece), and a dielectric subsystem 78. The electrode subsystem 74 includes an electrode tool 80, an electrode holder 82, a machine head 84, a connecting member 85, and a servo-mechanism 86. The electrode tool 80, referred to hereinbelow as the electrode 80, may comprise a plurality of electrodes, illustratively represented by electrode 80, aligned in a row. The electrode 80 mounts to the electrode holder 82, which attaches to the machine head 84. The connecting member 85 connects the machine head 84 to the servo-mechanism 86. The servo-mechanism 86 actuates the machine head 84 to move the electrode 80 toward or away from the blade airfoil 42, to narrow or widen a gap 88 between the electrode and the workpiece, i.e., the airfoil. The dielectric subsystem 78 includes a dielectric medium 90 and a dielectric reservoir/filtration system 92.

The EDM system 70 further comprises one or more sensors, referred to hereinbelow as the sensors represented by sensors 94, 96, 98, and a system controller/generator 100. The sensors 94, 96, 98, sense characteristics of one or more process parameters during the EDM process and provide one or more measurement signals, transmitted on signal lines 104, 106, 108 indicative thereof. The system controller/generator 90 receives the measurement signals transmitted over signal lines 104, 106, 108, and generates control and power signals, transmitted over signal line 110 and power conductor 112, respectively, for the EDM process.

The sensors 94, 96, 98 preferably comprise a displacement sensor 94, a current sensor 96, and a voltage sensor 98. The displacement sensor 94 may mount to the frame 72 and may sense the position of the machine head 84 through a connecting cable 114. The displacement sensor 94 senses the displacement between the position of the electrode 92 and a reference position (not shown), and provides a signal on the line 104 indicative thereof, illustratively shown as DISPLACEMENT. This signal is also indicative of the distance between the airfoil 42 and the electrode 80, i.e., the distance across the gap 88, because relative positioning between the airfoil and the reference position (not shown) preferably remains fixed throughout the EDM process. The current sensor 96, located in series with the power conductor 112, senses the current transmitted to the electrode subsystem 74, referred to herein as the gap current, and provides a signal on the line 106 indicative thereof. The current sensor may comprise a current shunt 120, which produces a differential voltage proportional to the gap current, and a voltage sensor 122. The voltage sensor 96 receives signals, on signal lines 124, 126, indicative of the voltage magnitude of the electrode and the workpiece, respectively, and provides a signal on the line 108 indicative of the differential thereof, referred to herein as the gap voltage. It should be understood that the voltage sensors 98, 122 could alternatively be provided by a single shared voltage meter (not shown).

In the present embodiment, the current sensor 96, the voltage sensor 98 and the system controller/generator reside within a shared enclosure (not shown) that provides limited accessibility to the signals inside. The measurement signals on lines 106, 108 from the current and the voltage sensors 96, 98 are not directly accessible from outside the enclosure. The system controller/generator 100 provides signals, illustratively shown as CURRENT and VOLTAGE on signal lines 130, 132, indicative of the current and the voltage signals on lines 106, 108, respectively.

The EDM system machines the airfoil until a predetermined depth is reached and whereby the passages should be complete. During machining, the EDM system employs an "on/off" cycle. Typically, the duration of the "on" portion and the "off" portion of the cycle depends on the position of the electrode relative to the airfoil. For example, a first "on" duration and a first "off" duration may be used from initiation of a first spark until the electrode reaches a predetermined first depth. A second "on" duration and a second "off" duration may be used until the electrode reaches a second depth. A third "on" duration and a third "off" duration may be used from break-through to a predetermined third depth. During this process, the DISPLACEMENT, VOLTAGE, AND CURRENT signals provide indications of the electrode displacement, the gap current, and the gap voltage process parameters, respectively.

The EDM system 70 further includes a signal processor 140 for use in predicting one or more characteristics of the attribute produced by the EDM process. The prediction is based on one or more measurement signals indicative of the characteristics of one or more EDM process parameters. For example, in the best mode embodiment, the signal processor receives the DISPLACEMENT, CURRENT, and VOLTAGE signals on signal lines 104, 130, 134 respectively, and the signal processor 140 provides signals indicative of the passage break-through and airflow characteristics, illustratively shown as BREAKTHROUGH and AIRFLOW, on signal lines 142, 144, respectively.

Referring now to FIG. 3A, in the best mode embodiment, the signal processor 140 comprises an input portion 150, a central processing unit (CPU) and memory portion 152, an output portion 154, and a bus portion 156 (FIG. 3) with connections 158 (FIG. 3) to each of the other portions of the signal processor 140. In such embodiment, the signal processor 140 may be a general purpose computer, e.g., an IBM compatible personal computer, and the input portion 150 may be a data acquisition board having a signal conditioning circuit and an analog to digital (A/D) converter circuit. In another embodiment, the signal processor 140 may be combined with the system controller/generator 100 (FIG. 2).

Figure 3B:
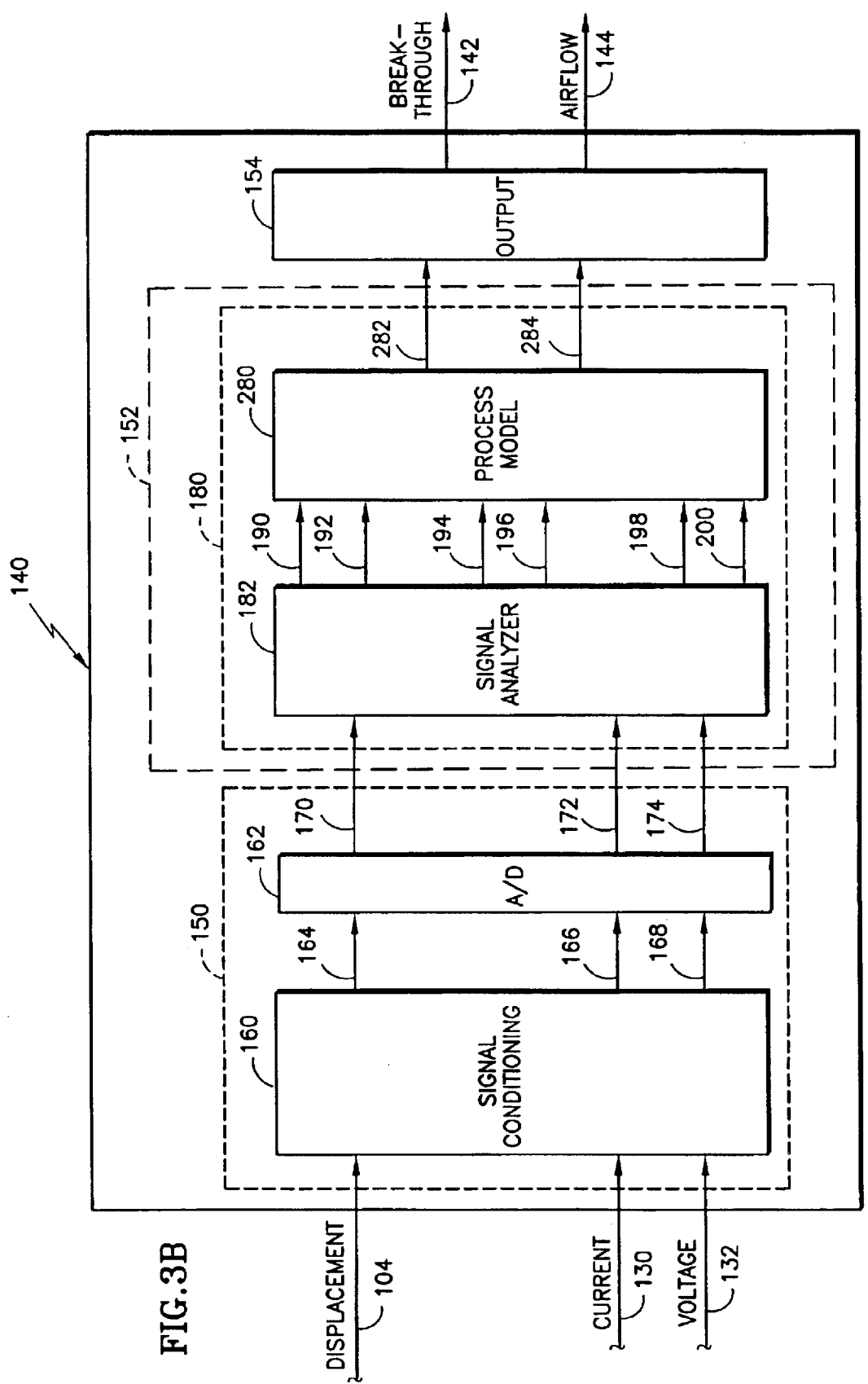
FIG. 3B is a functional block diagram of the signal processor that is part of the EDM system of FIG. 2.

Referring now to FIG. 3B, the input portion 150 of the signal processor 140 may comprise a signal conditioning circuit 160 and an A/D converter 162. The signal conditioning circuit receives the measured process parameter signals, e.g., the DISPLACEMENT, the CURRENT, and the VOLTAGE signals, conditions and noise filters the signals, and provides three conditioned process parameter signals on signal lines 164, 166, 168. The A/D converter receives the three conditioned process parameter signals, and at substantially periodic intervals, generates three digital process parameter signals, on lines 170, 172, 174, respectively, indicative of the magnitudes thereof.

The signal processor may further include a program 180, stored and executed in the memory and CPU portion 152. The program 180 may comprise a series of modules in software or firmware. One of these modules preferably comprises a signal analyzer 182. The signal analyzer 182 uses classical signal processing principles to generate, for each of the digital process parameter signals, one or more signals that provide a simplified representation of the magnitude of the digital process parameter signal during the process (over time).

Referring now to FIG. 4, in the best mode embodiment, the signal analyzer 182 performs, for each of the digital process parameter signals, a linear regression analysis, illustratively shown in blocks 184, 186, 188, respectively. On the basis of each regression analysis, the signal analyzer may provide a pair of signals, illustratively shown as three pairs of SLOPE and INTERCEPT, on lines 190, 192; 194, 196; and 198, 200; respectively. The SLOPE signal of each pair represents the change in magnitude of the digital process parameter signal over time (slope); the INTERCEPT signal of each pair represents an initial magnitude of the digital process parameter signal over time (y intercept). However, the signal analyzer 182 is not limited to performing linear regression analysis but rather may perform any other suitable analysis including but not limited to selection of a particular magnitude, selection of a magnitude at a particular time, averaging, a single or a multiple order curve fit, and the like.

Figure 5:
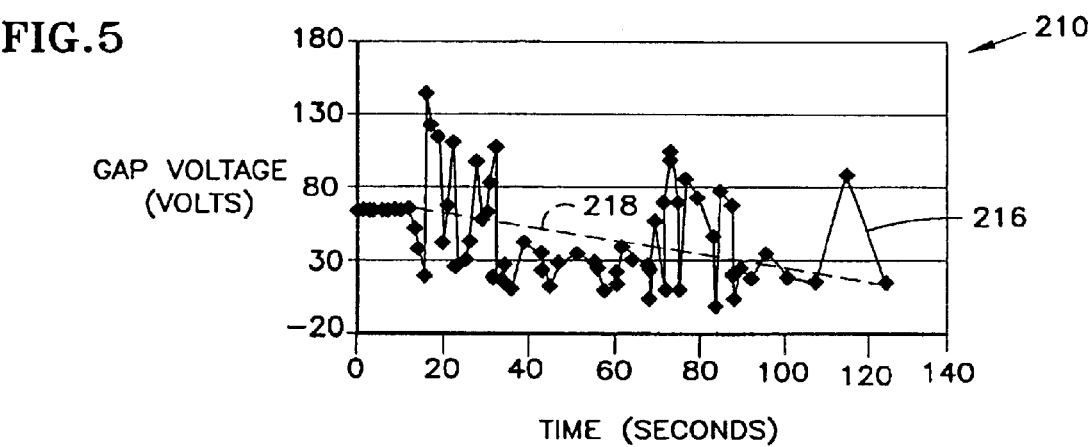
FIG. 5 is a graph illustrating the magnitude of a gap voltage parameter during an EDM process.
Figure 6:
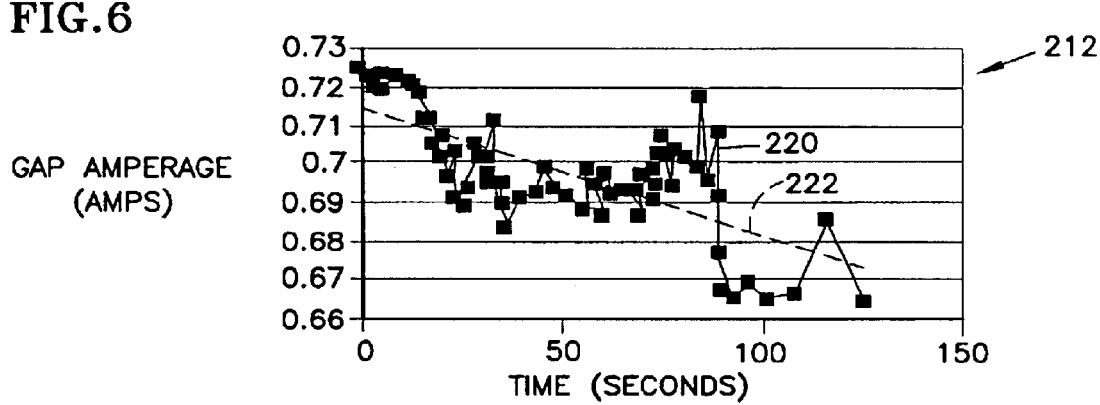
FIG. 6 is a graph illustrating the magnitude of a gap current parameter during the EDM process of FIG. 5.
Figure 7:
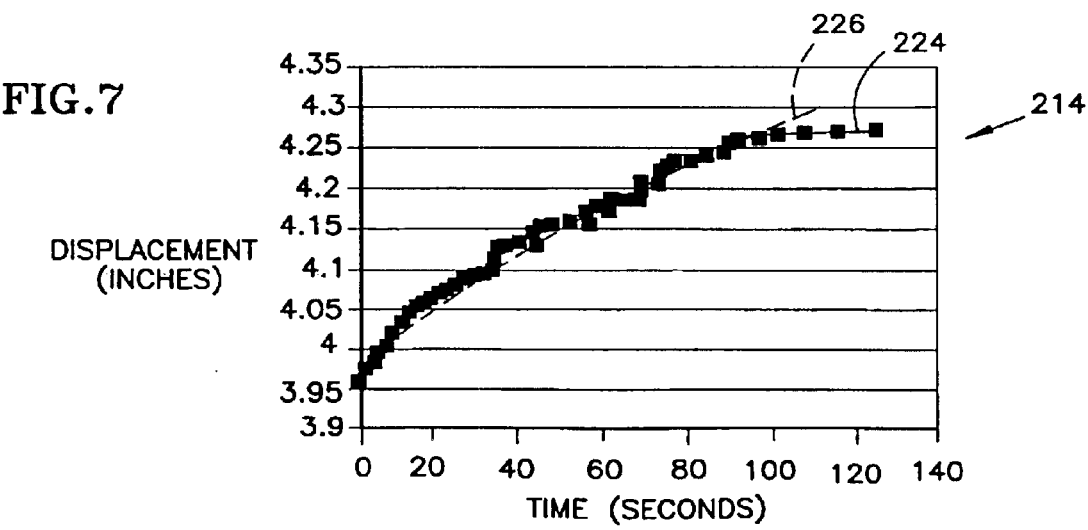
FIG. 7 is a graph illustrating the magnitude of an electrode displacement parameter during the EDM process of FIG. 5.
Figure 8:
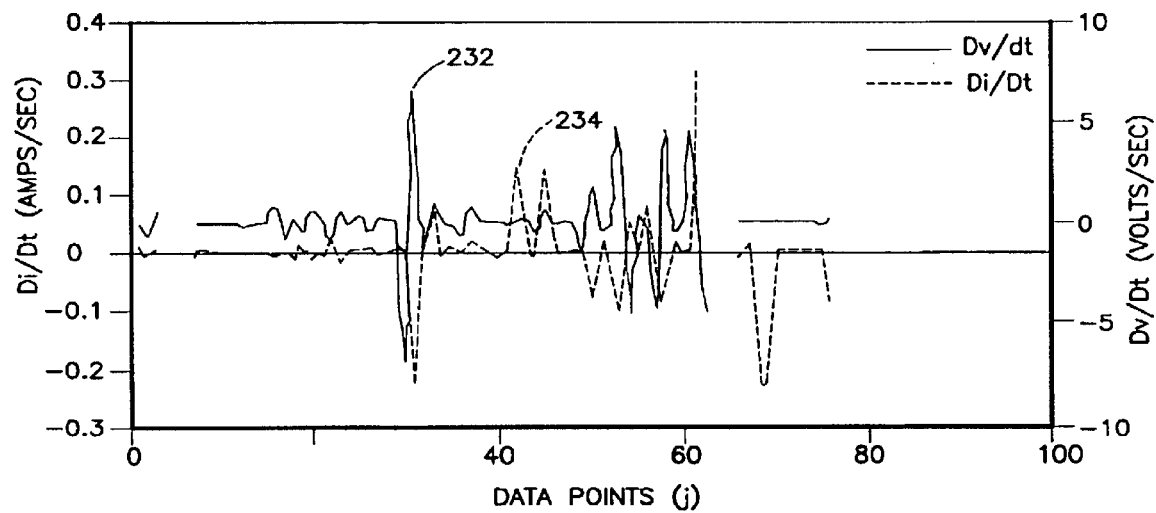
FIG. 8 is a graph illustrating the normalized differentiated magnitudes of the gap voltage and gap current parameters of FIGS. 5 and 6.
Figure 9:
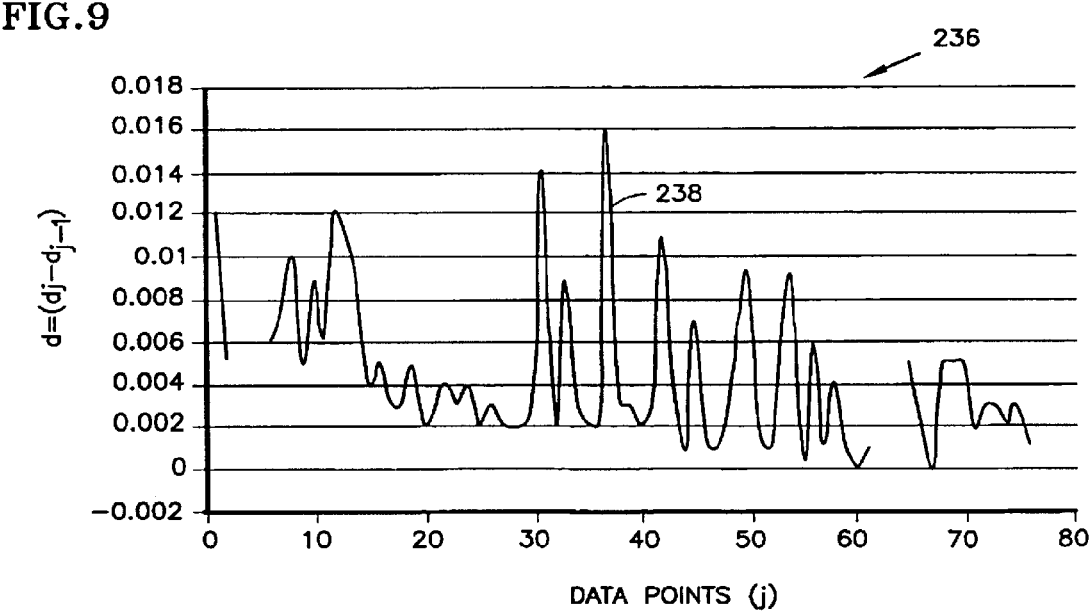
FIG. 9 is a graph illustrating the magnitude of incremental changes in the electrode displacement parameter of FIG. 7.
Figure 10:
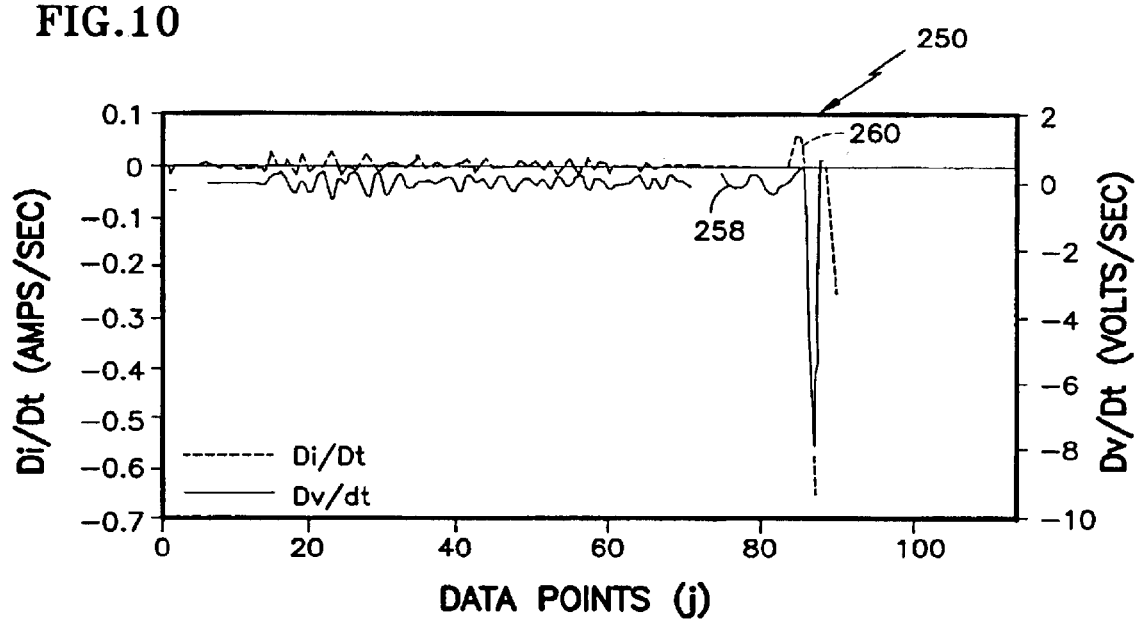
Figure 11:
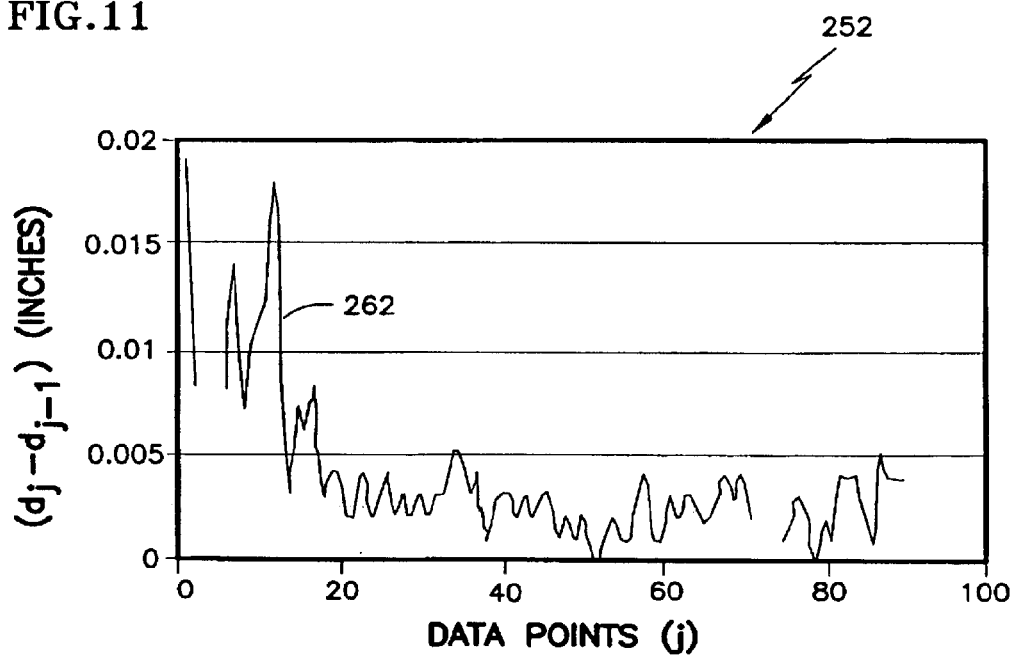
FIG. 11 is a graph illustrating the magnitude of incremental changes in the electrode displacement parameter for the EDM process of FIG. 10.
Figure 12:
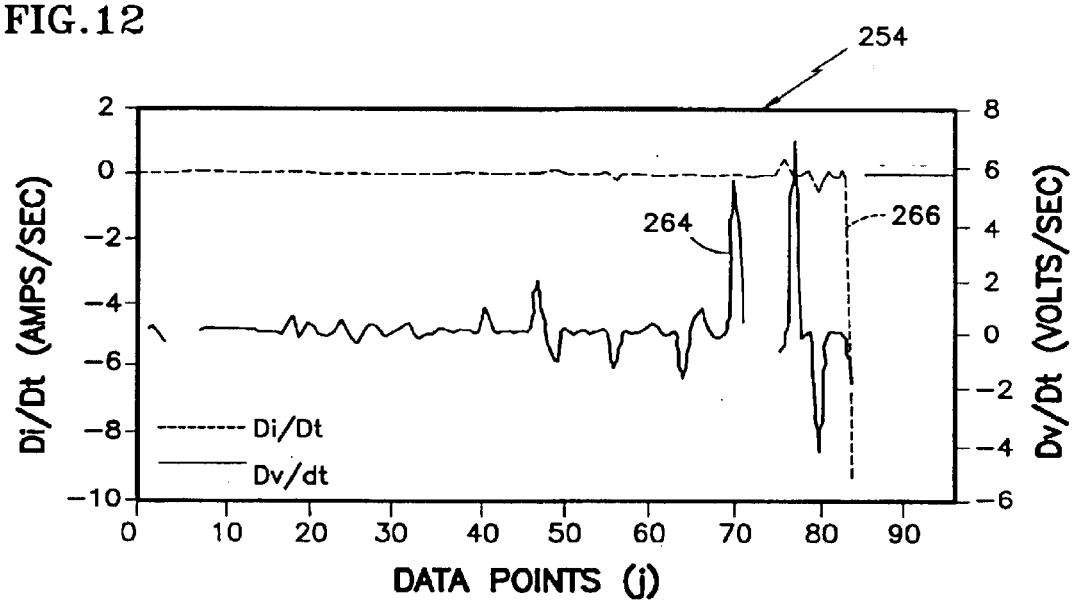
Figure 13:
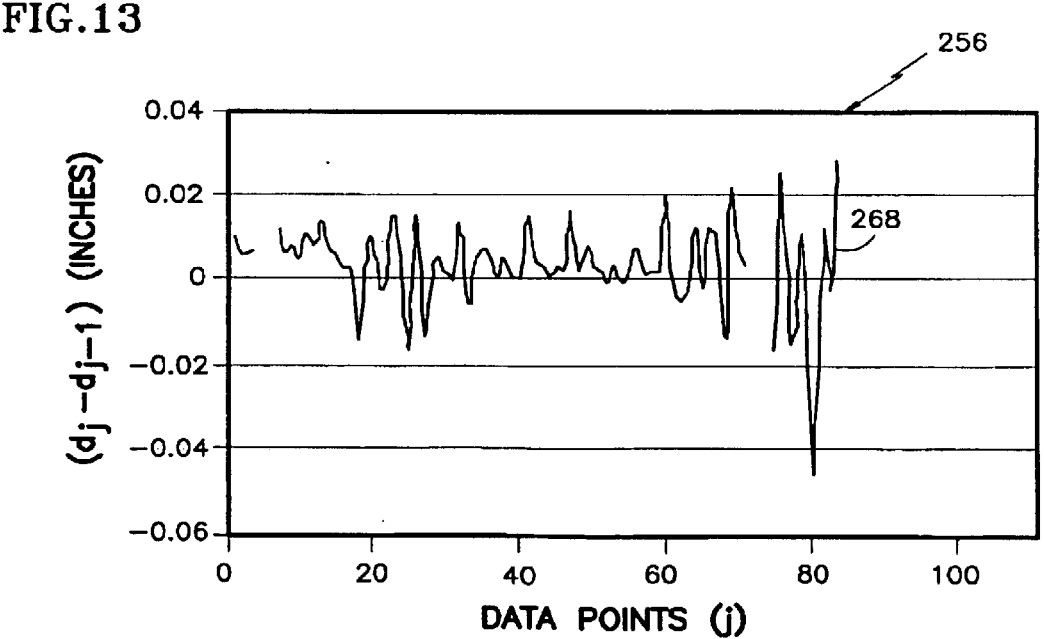
FIG. 13 is a graph illustrating the magnitude of incremental changes in the electrode displacement parameter for the EDM process of FIG. 12.

Referring now to FIGS. 5–7, for illustrative purposes, three graphs 210 (FIG. 5), 212 (FIG. 6), 214 (FIG. 7), depict characteristics of the process parameter signals provided to the signal analyzer 182 (FIGS. 3B, 4) and the signals generated, preferably during the EDM process, by the signal analyzer 182 (FIGS. 3B, 4). The first graph 210 (FIG. 5) has a first curve 216, shown by solid lines, illustrating the magnitude of the gap voltage versus time during a representative EDM process, and a second curve 218, shown by a broken line, illustrating the corresponding slope and the intercept generated by the signal analyzer 182 (FIGS. 3B, 4). The second graph 212 (FIG. 6) has a first curve 220, shown by solid lines, illustrating the magnitude of the gap current versus time during the EDM process, and a second curve 222, shown by a broken line, illustrating the corresponding slope and the intercept generated by the signal analyzer 182 (FIGS. 3B, 4). The third graph 214 (FIG. 7) has a first curve 224, shown by solid lines, illustrating the magnitude of the displacement versus time during the EDM process, and a second curve 226, shown by a broken line, illustrating the corresponding slope and the intercept generated by the signal analyzer 182 (FIGS. 3B, 4). As the curves 216 (FIG. 5), 220 (FIG. 6), 224 (FIG. 7) depict, the voltage and the current across the gap fluctuate throughout the EDM process; and the electrode advances into the workpiece in a non-linear fashion. Signals comparable to those illustrated by FIGS. 5–7 are generated for each machined workpiece. Referring now to FIGS. 8 and 9, it is instructive to illustrate the above data in other ways. For example, a graph 230 (FIG. 8) has two curves 232, 234, one each depicting the voltage data and current data, respectively, from above after normalization and differentiation. Another graph 236 has a curve 238 depicting the displacement data from above in terms of incremental change, that is Δd.

The data represented in FIGS. 5–9 represents the magnitude of the process parameters during an EDM process that resulted in passages having complete break-through and a normalized airflow pressure ratio ("AFPR") of 0.828. According to the trend illustrated by the curves 216 (FIG. 5), 232 (FIG. 8), higher voltage variations are initially required to ionize the fluid and induce the first spark. While the electrode travels smoothly into the workpiece, an increased fluctuating displacement trend (see curve 238 (FIG. 9)) with large displacement increments occurs. As curves 232, 234 (FIG. 8) illustrate, spiking of the voltage and current becomes more apparent with increasing metal removal. Curve 234 (FIG. 8) illustrates that EDM break-through involves increasing variation as the electrode approaches the greatest allowable depth into the workpiece. During this stage, the electrode retracts and contracts moderately (see curve 238 (FIG. 9)).

Referring now to FIGS. 10–13, four graphs 250, 252, 254, 256, further illustrate the relationship between the process parameters and the resulting attribute characteristics. The first graph 250 (FIG. 10) has two curves 258, 260, depicting the voltage and the current data, respectively, from an EDM process resulting in passages with complete break-through and normalized AFPR of 0.647 characteristics. The second graph 252 (FIG. 11) has a curve 262 depicting the displacement data from that process. The third graph 254 (FIG. 12) has two curves 264, 266, depicting the voltage and the current data, respectively, from an EDM process resulting in passages with incomplete break-through and normalized AFPR of 0.709 characteristics. The fourth graph 256 (FIG. 13) has a curve 268 depicting the displacement data from that process.

Incomplete break-through can occur when the EDM system does not compensate for some variations during the process. Incomplete break-through cycles generally involve larger displacement increments and higher energy levels to account for variations introduced during the process. This is particularly illustrated towards the end of the EDM cycle. The source of variation may reside in multiple areas including but not limited to the workpiece, electrode, dielectric fluid, EDM tooling, operating technique, and environmental. While these variations can be identified and removed from the system temporarily, they can re-manifest in the process at any time.

Referring again to FIG. 3B, the program 180 in the signal processor 140 further comprises another module referred to herein as a process model 280. The process model 280 preferably receives the signals generated by the signal analyzer 182 and in response provides one or more prediction signals indicative of one or more predicted characteristics of the attribute produced by the EDM process. For example, in the best mode embodiment, the process model 280 provides two prediction signals, one indicative of the break-through characteristics and one indicative of the airflow characteristics, on signal lines 282, 284, respectively, indicative of the quality of the machined passages.

Figure 14A:
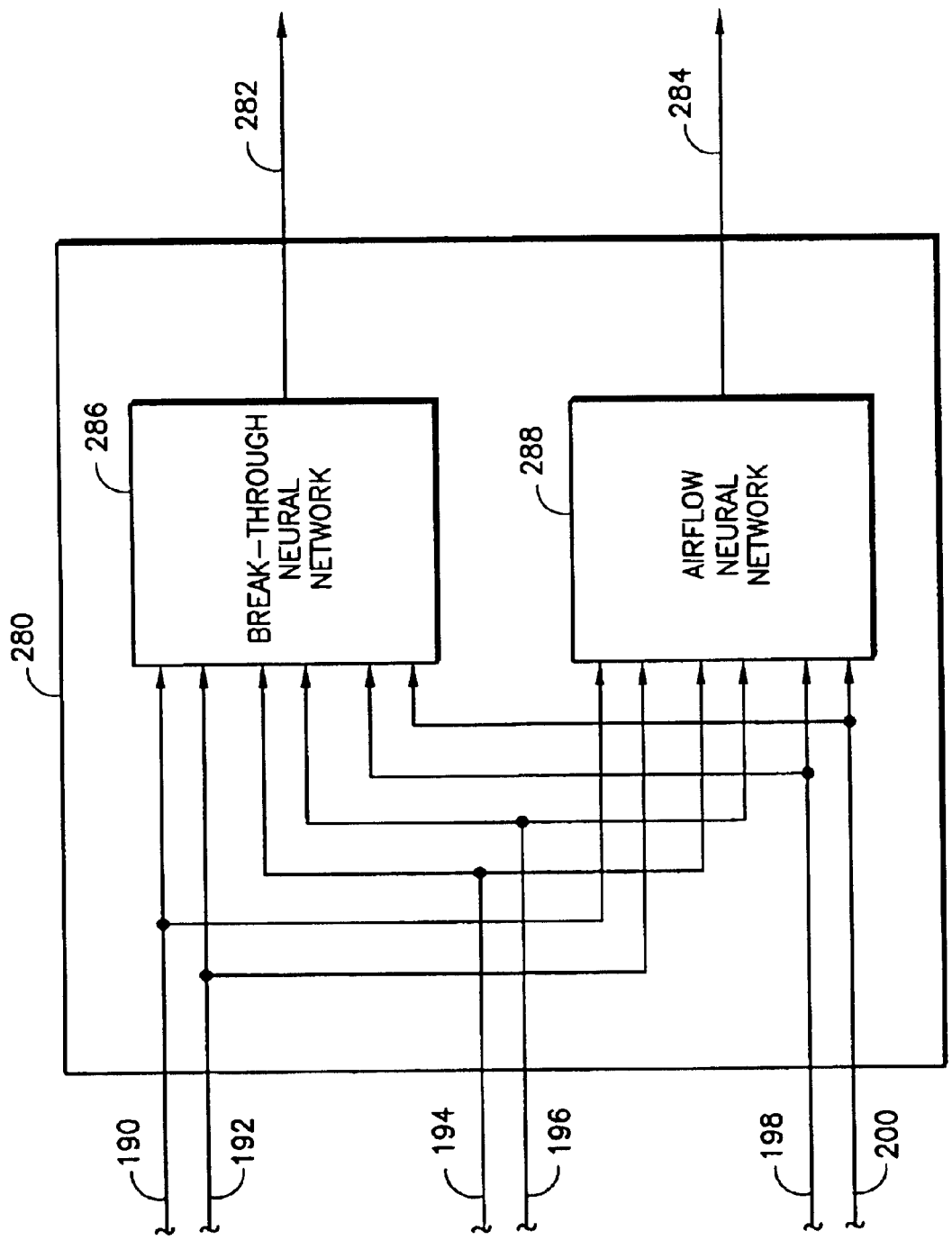
FIG. 14A is a functional block of a process model having two neural networks, one for break-through and one for airflow.

The process model 280 is preferably an intelligent model preferably comprising one or more trained neural networks, however any other suitable model may be used including but not limited to a response surface methodology ("RSM") model. Referring now to FIG. 14A, the process model 280 may have two neural networks 286, 288, one to predict break-through and one to predict airflow, respectively.

Figure 14B:
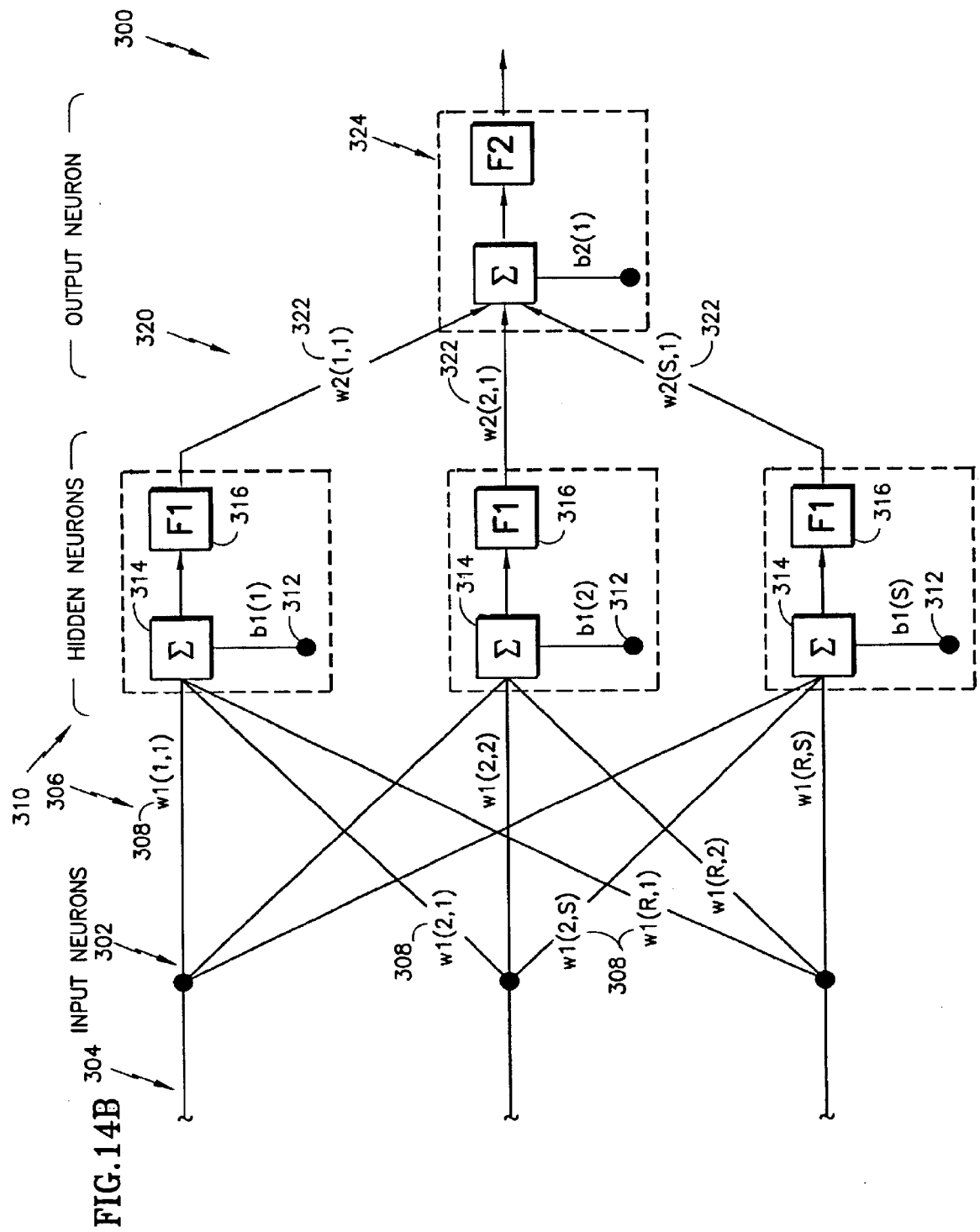
FIG. 14B is a simplified schematic representation of a portion of a neural network having an input layer, a hidden layer and an output layer.

Referring now to FIG. 14B, a neural network 300 comprises a plurality of neurons i.e. basic processing elements, including input neurons 302, which may simply be isolation buffers, to receive input signals 304 for the network. The outputs of the input neurons are coupled via connecting links 306 to selected ones of the inputs of a plurality of second level neurons 310. Each link 306 has associated with it a weighting factor 308 for multiplying the signal being transmitted by the link 306. Each neuron may further have a bias input 312. The collective input to the neuron is the sum 314 of all of the weighted incoming signals from the connecting links 306, plus any bias 312. Each neuron has associated with it an activation function 316, i.e., transfer function, which may be nonlinear, to which the neuron provides the collective input signal, to generate an output signal. The weights and biases are parameters that can be adjusted so that the network can exhibit some desired behavior during its training phase. The outputs of the second level neurons may themselves further be coupled through another set of connecting links 320, with respective weighting factor 322, to inputs of respective one(s) of one or more third level neurons 324. In this case the second level neurons are often referred to as "hidden" neurons. The outputs of the third level neurons may be provided as the outputs of the overall network, in which case these neurons may be referred to as "output neurons", or they may be coupled to yet additional layers of neurons (not shown). In addition, in some neural network architectures, outputs of some of the neurons are fed back (not shown) to the inputs of a prior level.

If the weights associated with the connecting links are made variable, then the network may be given the capacity to "learn". Alternatively, the learning process may be simulated off-line, and once the connecting link weights are determined, they can be transferred into a hardware chip (not shown), firmware, software, or other memory.

The number of layers, the number of neurons, and the activation functions are preferably selected so as to optimize the model in regard to accuracy, etc. In one embodiment, each of the neural networks 286, 288 (FIG. 14A) comprises a feed forward network with an input layer having six input neurons, one hidden layer having twenty neurons, and an output layer having one neuron. In contrast, an embodiment having a single layer neural network for the break-through prediction provided inferior results compared to that of the two layer network. Note however, that the two networks 286, 288 (FIG. 14A) need not have similar architectures.

The activation functions are preferably selected based on the range of the activation function and the range of the target values. The neural network for predicting the break-through characteristic 286 (FIG. 14A) uses a logistic sigmoid (or binary sigmoid) activation function for the both the hidden and output layers. The logistic sigmoid activation function, is useful for applications having bipolar target output values. Break-through is characterized by Values between 0 and 1 are used to characterize break-through, wherein all zeros represent complete break-through and all ones represent incomplete break-through. The neural network for predicting the airflow characteristic 288 (FIG. 14A) uses a tan-sigmoid activation function for the hidden layer and linear activation function for the output layer.

Figure 14C:
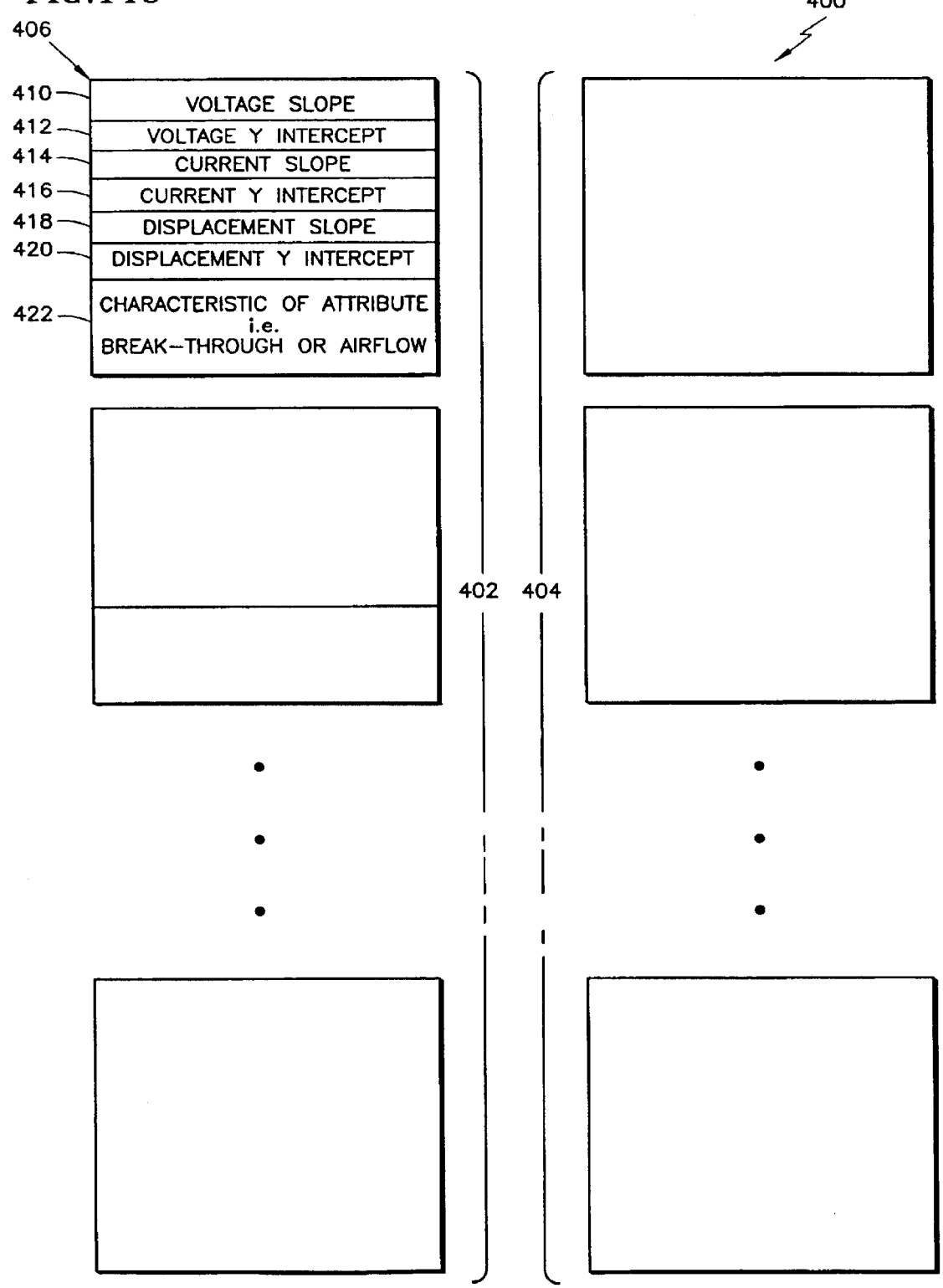
FIG. 14C is an illustration of a plurality of training data sets used in training the process model of FIG. 14A.

The neural networks 286, 288 (FIG. 14A) are typically prepared, commonly referred to as trained, in advance to predict a characteristic of an attribute resulting from an EDM process on the basis of the characteristics of one or more process parameters during the EDM process. Referring now to FIG. 14C, the training process preferably comprises supplying the neural networks 286, 288 (FIG. 14A) with a plurality of training data sets 400, sometimes referred to as training vectors (or patterns) and associated target outputs. The plurality of training data sets 400 may be divided into a training group 402 of training data sets and a training-testing group 404 of training data sets.

Each training data set typically represents process parameter data collected during a particular performance of the process, and attribute data resulting from that performance of the process. The process parameter data is to be input to the model 280 (FIGS. 3B, 14A). The attribute data is the target, i.e., desired, output from the model. The process parameter data is preferably indicative of the process parameters characteristics upon which the prediction is to be based; the attribute data is preferably indicative of the attribute characteristic to be predicted. For the best mode embodiment, an exemplary training data set 406 includes the gap voltage slope 410 and y intercept 412, the gap current slope 414 and y intercept 416, the electrode displacement slope 418 and y intercept 420, and the resulting break-through and/or airflow characteristic 422.

The training data sets 400 should include sets representing process performances resulting in acceptable attributes, e.g., break-through complete, and process performances resulting in unacceptable attributes, e.g., break-through not complete. The training data sets 400 preferably represents as many possible scenarios of process parameters and resulting attributes as is practical to ascertain, and ideally represents the full range of variations of the factors affecting the EDM process. The use of training data representing a varied range of scenarios results in a model that is better able to predict the characteristic of the attribute across the range of possible scenarios. Training preferably includes a backpropagation step that effectively improves the accuracy with which the model predicts the characteristic of the attribute.

A supervised backpropagation training technique is commonly used on multiple-layer feed-forward neural networks to minimize the mean squared error of each training data set. The training group 402 of training data sets is preferably used to train the network 286, 288 (FIG. 14A) until it can perform pattern association, pattern classification, and function approximation through the minimization of the sum squared error. The least square error of the neural network may be used to determine the model's effectiveness to simulate the actual data. Once the trained network satisfactorily represents the data used to train the network, the neural network's ability to generalize may be determined using the training-testing group of training data sets and computation of a total least squared error. Training preferably continues so long as the error for the training-testing group decreases but ends when the error starts to increase. At that point, the network model starts to memorize the data sets and begins to lose its ability to generalize.

The training speed can be improved by using weight and bias initialization techniques that can help improve the networks ability to learn. If the initialization is too large, the updating of weights and biases between units can be zero. The update of weights and biases between two units depends on the derivative of the upper unit activation function and the lower unit activation function. Therefore, it is recommended to avoid weight and bias initialization that results in zero values for the activation and derivative of activation functions. However, if the initialization is too small, then the net input to a hidden or output unit will be close to zero, causing very slow learning. The weights are preferably randomly initialized using the activation functions and the target values.

Neural network models 286, 288 (FIG. 14A) can typically be optimized by heuristics and by using more powerful methods of optimization, including momentum, adaptive learning rate, and the Levenberg-Maquardt techniques. Momentum decreases the backpropagation's sensitivity to small details in the error surface allowing the network to converge faster to lower an error solution (rather than shallow minima errors). Adaptive learning speeds the training phase by maintaining large learning steps and thus maintaining the network learning stable. The Levenberg-Marquardt technique uses an approximation of Newton's method to optimize the network training performance.

Backpropagation with momentum networks are typically used when some training data points are significantly different from the majority of the training data points. Training may start with incremental backpropagation and then switch to conjugate gradient based backpropagation for the final convergence phase.

The Levenberg-Marquardt update rule, also known as the hybrid learning algorithm was used to optimize the network during training. Training preferably starts with incremental backpropagation and then switches to conjugate gradient based backpropagation for the final convergence phase. This rule provides even faster and more accurate results near an error minimum by approximating the Gauss-Newton method, as $\zeta$ decreases over time, such that:

$$\Delta \overline{W} = (\overline{J}^T \overline{J} + \zeta \overline{I})^{-1} \overline{J} \overline{e}$$

where $\overline{J}$, $\zeta$, $\overline{I}$ and $\overline{e}$ represent the Jacobian matrix of derivatives of each error to each weight, a scalar, the identity matrix and the error vector, respectively.

In regard to the neural network 286 (FIG. 14A) for predicting the break-through characteristic, the network's learning rate, momentum, sum-squared error, and number of layers had a direct effect on the network's ability to learn about the process and predict quality. In this embodiment, a learning rate of 5 and a momentum of 0.95 were determined to optimum. The Levenberg-Marquardt algorithm was used (using $\zeta_{initial}=100$, $\zeta_{max}=1E10$, $\zeta^+=10$, $\zeta^-=0.1$, and minimum gradient=1E-12) to enhance the network's ability to generalize about EDM quality attributes 100% of the times. A combination of both gradient descent and Gauss-Newton techniques were used to compute all weights and biases needed for break-through prediction.

In regard to the neural network 288 (FIG. 14A) for predicting the airflow characteristic, the network's learning rate and momentum had little effect on the network's ability to learn and predict airflow. In this embodiment, a learning rate of 0.01 and a momentum of 0.85 were used. The sum-squared error, however improved the network's ability to memorize patterns. Use of the Levenberg-Marquardt algorithm (using $\zeta_{initial}=0.001$, $\zeta_{max}=1E10$, $\zeta^+=10$, $\zeta^-=0.1$, and minimum gradient=0.0001) improved the network's ability to generalize. The model weights and biases were defined using the Gauss-Newton technique, thereby reducing the network's error window from 7.8% to 2.3%.

Figure 15:
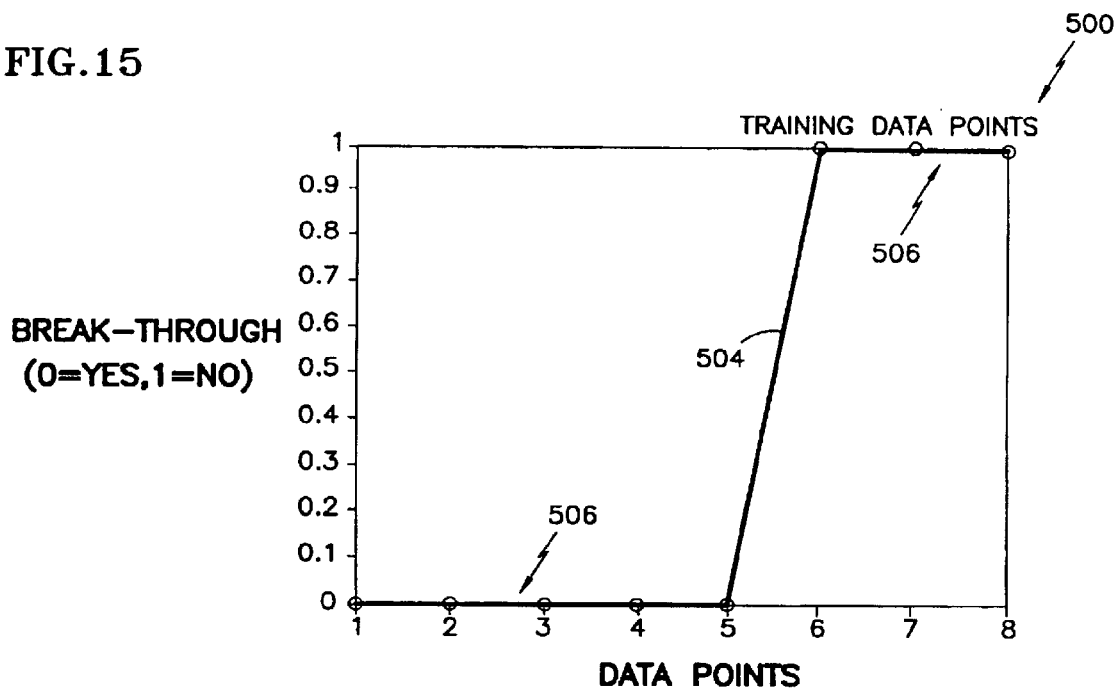
FIG. 15 is a graph illustrating the data points used to train the neural network model for predicting break-through characteristics of passages.
Figure 16:
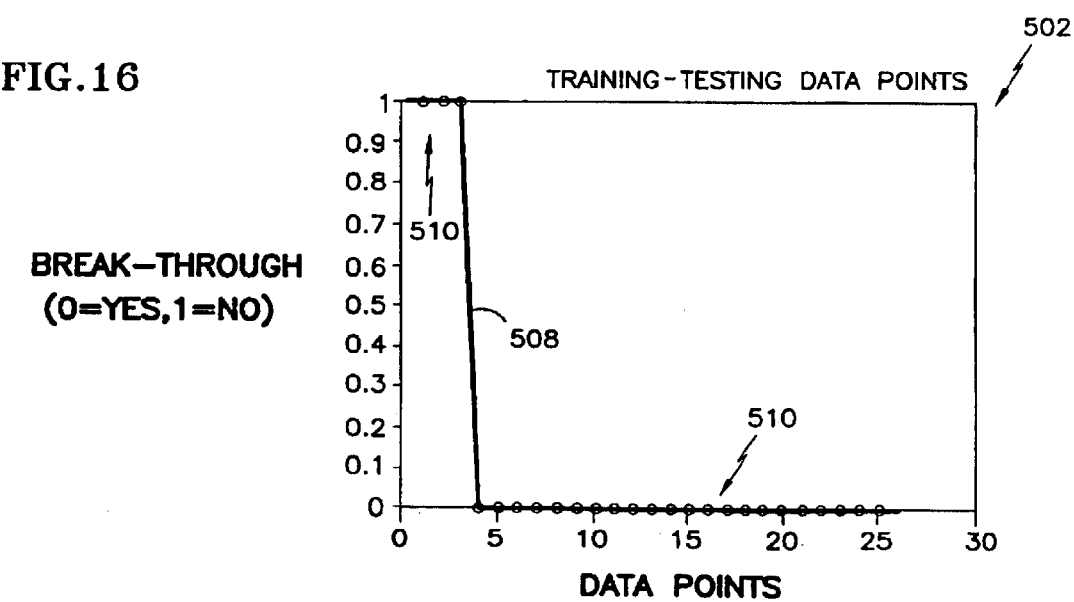
FIG. 16 is a graph illustrating the test data points used to verify the neural network model for predicting break-through characteristics of passages.

Referring now to FIGS. 15, 16, two graphs 500 (FIG. 15), 502 (FIG. 16) depict the trained data points and the test data points, respectively, for the network that predicts break-through. The graph 500 (FIG. 15) depicting the trained data points illustrates the network's ability to learn. The graph 500 (FIG. 15) has a solid line 504 indicating target outputs, and a plurality of circles 506 indicating the prediction from the neural network. The graph 502 (FIG. 16) depicting the test data points illustrates the network's ability to generalize. The graph 502 (FIG. 16) has a solid line 508 indicating target outputs, and a plurality of circles 510 indicating the prediction from the neural network. As these graphs illustrate, the network predicts EDM break-through 100% of the time for all training and test data points.

Figure 17:
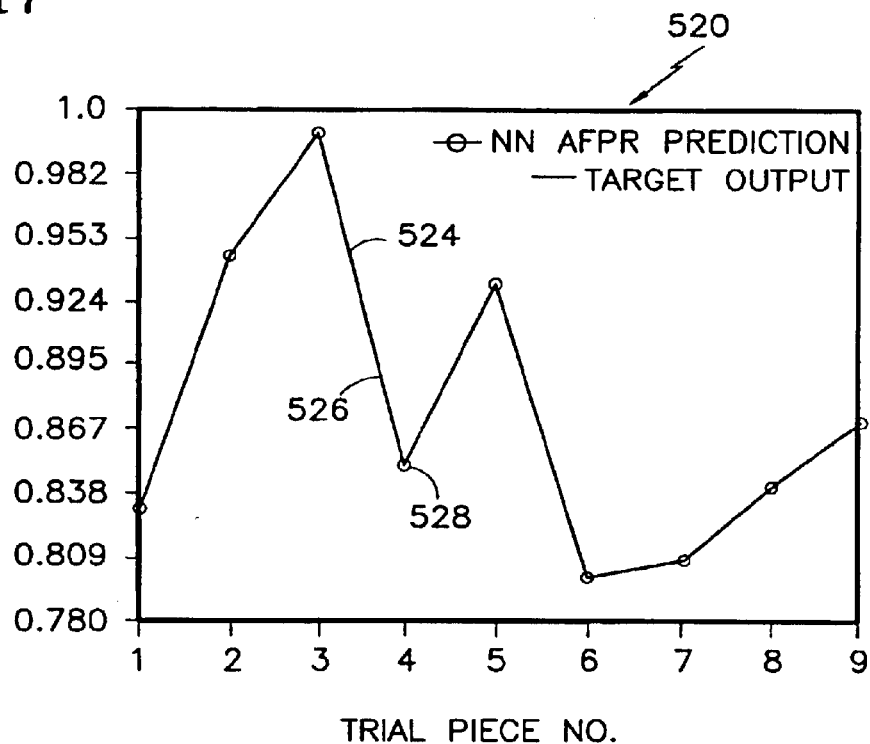
FIG. 17 is a graph illustrating the data points used to train the neural network model for predicting airflow characteristics of passages.
Figure 18:
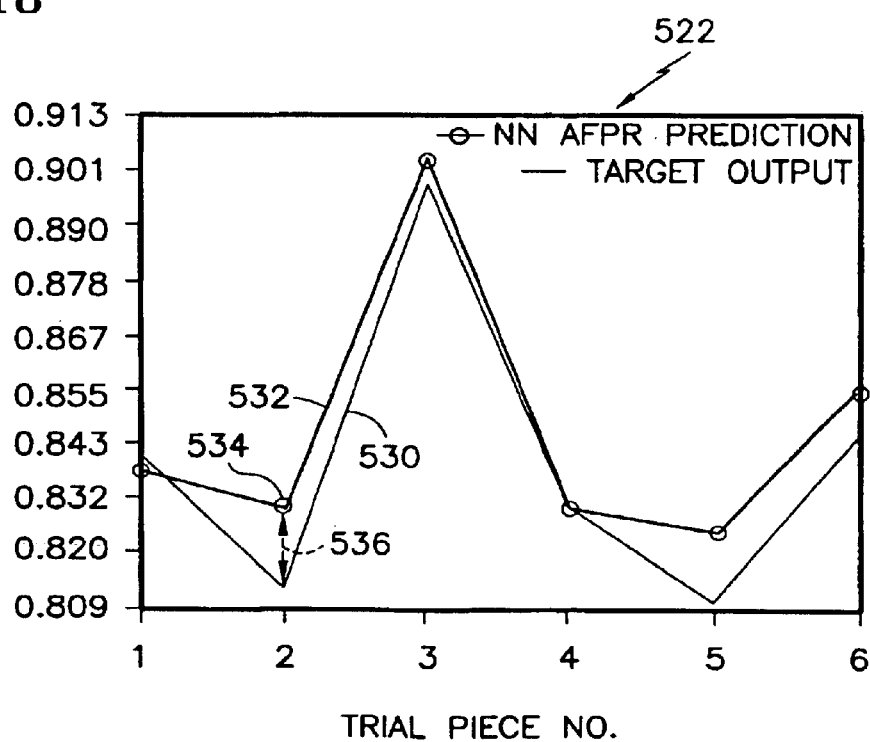
FIG. 18 is a graph illustrating the test data points used to verify the neural network model for predicting airflow characteristics of passages
Figures 20, 21, 22:
FIG. 20 is a graph illustrating numerical data indicative of biases associated with hidden neurons for the neural network that predicts break-through characteristics.
FIG. 21 is a graph illustrating numerical data indicative of weights associated with connecting links between hidden neurons and an output neuron for the neural network that predicts break-through characteristics.
FIG. 22 is a graph illustrating numerical data indicative of biases associated with the output neuron for the neural network that predicts break-through characteristics.

Referring now to FIGS. 17, 18, two graphs 520 (FIG. 17), 522 (FIG. 18) depict normalized AFPR trained data points and test data points, respectively, for the network that predicts airflow. The graph 520 (FIG. 17) depicting the trained data points illustrates the network's ability to learn. The graph 520 (FIG. 17) has a solid line 524 indicating target outputs, and a solid line 526 (substantially coincident with the line 524) with a plurality of circled points 528 indicating the prediction from the neural network. As the graph 520 (FIG. 17) illustrates, the network predictions closely match the target outputs. The graph 522 (FIG. 18) depicting the test data points illustrate the network's ability to generalize. The graph 522 (FIG. 18) has a solid line 530 indicating target outputs, and a solid line 532 with a plurality of circled points 534 indicating the prediction from the neural network. As the graph 522 (FIG. 18) illustrates, the network produced an airflow prediction 100% of the time. Furthermore, the maximum error, illustrated by a dotted dual arrowhead line 536 is only 2.3%. With only a 2.3% error window, the model provides a more accurate indication than that provided by traditional off-line airflow measurement techniques, which are subject to human error.

Referring now to FIGS. 19–22, four charts 550 (FIG. 19), 552 (FIG. 20), 554 (FIG. 21), 556 (FIG. 22) provide numerical data indicative of preferred weights and biases for the neural network 286 (FIG. 14A) that predicts break-through characteristics, although any other weights and biases may be used. The chart 550 (FIG. 19) provides numerical data indicative of weights associated with the connecting links between the input neurons and the hidden neurons. The chart 552 (FIG. 20) provides numerical data indicative of biases associated with the hidden neurons. The chart 554 (FIG. 21) provides numerical data indicative of weights associated with the connecting links between the hidden neurons and the output neuron. The chart 556 (FIG. 20) provides numerical data indicative of the bias associated with the output neuron.

Referring now to FIGS. 23–26, four charts 560 (FIG. 23), 562 (FIG. 24), 564 (FIG. 25), 566 (FIG. 26) provide numerical data indicative of preferred weights and biases for the neural network 288 (FIG. 14A) that predicts airflow characteristics, although any other weights and biases may be used. The chart 560 (FIG. 23) provides numerical data indicative of weights associated with the connecting links between the input neurons and the hidden neurons. The chart 562 (FIG. 24) provides numerical data indicative of biases associated with the hidden neurons. The chart 564 (FIG. 25) provides numerical data indicative of weights associated with the connecting links between the hidden neurons and the output neuron. The chart 566 (FIG. 26) provides numerical data indicative of the bias associated with the output neuron.

In the best mode embodiment, the models were trained with data sets collected over a six month time period. Even better results could be obtained using data sets collected over a one or two years period so as to encompass a greater percentage of all possible processing scenarios encountered in EDM. Other characteristics, e.g., other quality characteristics, can be incorporated during the training to accommodate for other needs. In other embodiments, an adaptive model may be used wherein the model is trained, retrained, and/or adapted over time.

In the preferred embodiment, the magnitude of each input signal, including training data signals, to the process model 280 is normalized, prior to input to the model, relative to the largest magnitude expected for that signal. Thus, the magnitude of each input signal to the process model 280 is in the range between 0 and 1. Normalization helps to make the model converge faster compared to that without normalization. Consequently however, the magnitude of the output signals from the process model 280 are in the range between 0 and 1. The output signals from the process model may be de-normalized relative to the largest magnitude expected for that signal.

The present invention can predict the characteristics of an attribute produced by a process. Thus, the present invention offers a potential for reducing and or eliminating the need for post inspection and therefore the cost, labor, material, and space associated with such inspection. In addition, the present invention also introduces a more robust and reliable approach to quality measure enabling better control and tracking of product quality issues.

Further, since the quality attributes can, but need not, be determined in real-time, the model can be incorporated into an intelligent control to prevent defects and help ensure the quality attributes manufactured into the product. The present invention does not require that the process be completed prior to producing a prediction of the characteristics of the attribute. While the prediction may be made immediately after the process, there is no requirement that a prediction be made immediately after completion of the process.

Those skilled in the art will recognize that although the signal processor in the disclosed embodiment comprises programmed hardware, i.e. executed in software by a computer, it may take other forms, including hardwired hardware configurations, hardware manufactured in integrated circuit form, firmware, and combinations thereof. Furthermore, it should be understood that although the disclosed embodiment comprises a digital system with periodically sampled signals, the present invention may also be embodied in an analog system with continuous signals, or a combination of digital and analog systems. Moreover, the signal processor may include all or none, or any combination of the specific aspects described in the best mode embodiment.

Although the present invention is disclosed with respect to a best mode embodiment for use in an EDM system, the present invention may be used with any process, including but not limited to any stochastic machining processes. Thus, the present invention may be used to predict a characteristic of any other attribute, produced by EDM, on the blade or any other gas turbine engine component. Further, although the best mode of the present invention provides one signal indicative of the break-though characteristics of all of the passages in a row, and one signal indicative of the airflow characteristics of all of the passages in a row, this does not preclude an embodiment having signals indicative of the break-through and airflow characteristics for less than all of the passages in a row, or if desired, individual passages.

Although the best mode embodiment uses two separate models, one to predict break-through and one to predict airflow, there is no requirement for two models. Furthermore, those skilled in the art should recognize that although the sensors in the best mode embodiment sense displacement, voltage, and current, other sensors or combination of sensors may be used to measure any suitable process parameter characteristics to predict a characteristic of an attribute of a product. Although the best mode embodiment provides gap voltage and current signals to the signal processor by way of the EDM system controller/generator, this is not required for the present invention because the signal processor may interface with sensors directly.

While the particular invention has been described with reference to a best mode embodiment, this description is not meant to be construed in a limiting sense. It is understood that various modifications of the best mode embodiment, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. An apparatus for predicting a characteristic of an attribute of a workpiece, the attribute having been produced as a result of a stochastic machining process, the apparatus comprising:
    at least one sensor that senses a characteristic of at least one parameter associated with the stochastic machining process and provides at least one measurement signal indicative thereof; and
    signal processor means, responsive to the at least one measurement signal, having a model indicative of a correspondence between the characteristic of the at least one parameter associated with the stochastic machining process and the characteristic of the resulting product attribute, and using said model to generate a signal indicative of the characteristic of the attribute of the workpiece to predict the characteristic of the attribute.

2. The apparatus of claim 1, wherein the signal processing means comprises a trained artificial neural network for generating the signal indicative of the characteristic of the attribute of the workpiece.

3. The apparatus of claim 1, wherein the signal processing means comprises
    signal analyzer means, responsive to the at least one measurement signal, for generating at least one analyzer signal representative of a line fit to the magnitude of the at least one measurement signal during the stochastic machining process; and model means, responsive to the at least one analyzer signal, for generating the signal indicative of the characteristic of the attribute of the workpiece in accordance with a predetermined correspondence between lines fit to the magnitude of the at least one measurement signal and characteristics of attributes resulting therefrom.

4. The apparatus of claim 3, wherein the at least one analyzer signal comprises a signal indicative of a slope and a signal indicative of an intercept for the magnitude of the at least one measurement signal during the stochastic machining process.

5. The apparatus of claim 1, wherein the stochastic machining process is an electrical discharge machining process, the at least one sensor comprises at least one sensor that senses a characteristic of at least one parameter associated with the electrical discharge machining process and provides at least one measurement signal indicative thereof, and the signal processing means comprises means for generating the signal indicative of the characteristic of the attribute in accordance with a predetermined correspondence between characteristics of the at least one parameter of the electrical discharge machining process and characteristics of attributes resulting therefrom.

6. The apparatus of claim 5, wherein the at least one process parameter includes a voltage differential between an electrode and the workpiece, and further includes a current between the electrode and the workpiece.

7. The apparatus of claim 6, wherein the at least one process parameter further includes a distance between the electrode and the workpiece.

8. The apparatus of claim 7, wherein the attribute comprises at least one passage and the signal processing means comprises means for generating the signal indicative of the characteristic of the attribute in accordance with a predetermined correspondence between characteristics of the at least one parameter of the electrical discharge machining process and characteristics of at least one passage resulting therefrom.

9. The apparatus of claim 1, wherein the attribute comprises at least one passage and the signal processing means comprises means for generating the signal indicative of the characteristic of the attribute in accordance with a predetermined correspondence between characteristics of the at least one parameter of the electrical discharge machining process and characteristics of at least one passage resulting therefrom.

10. The apparatus of claim 9, wherein the signal indicative of the characteristic of the attribute comprises a signal indicative of a breakthrough condition for the at least one passage.

11. The apparatus of claim 9, wherein the signal indicative of the characteristic of the attribute comprises a signal indicative of an airflow measure for the at least one passage.

12. A method for predicting a characteristic of an attribute of a workpiece, the attribute having been produced as a result of a stochastic machining process, the method comprising the steps of:
    sensing a characteristic of at least one parameter associated with the stochastic machining process and providing at least one measurement signal indicative thereof; and
    generating, in response to the at least one measurement signal, a predicted signal indicative of the characteristic of the attribute of the workpiece, said predicted signal being generated by a model.

13. The method of claim 12, wherein the step of generating comprises training an artificial neural network included in said model.

14. The method of claim 12, wherein the step of generating comprises:
  generating at least one analyzer signal representative of a line fit to the magnitude of the at least one measurement signal during the stochastic machining process; and
  generating the signal indicative of the characteristic of the attribute of the workpiece in accordance with a predetermined correspondence between lines fit to the magnitude of the at least one measurement signal and characteristics of attributes resulting therefrom.

15. The method of claim 14, wherein the step of generating the predicted signal indicative of the characteristic of the attribute comprises generating a signal indicative of a slope and a signal indicative of an intercept for the magnitude of the at least one measurement signal during the stochastic machining process.

16. The method of claim 12, wherein the stochastic machining process is an electrical discharge machining process, the step of sensing comprises sensing a characteristic of at least one parameter associated with the electrical discharge machining process and providing at least one measurement signal indicative thereof, and the step of generating comprises generating the signal indicative of the characteristic of the attribute in accordance with a predetermined correspondence between characteristics of the at least one parameter of the electrical discharge machining process and characteristics of attributes resulting therefrom.

17. The method of claim 16, wherein the step of sensing includes sensing a voltage differential between an electrode and the workpiece and further includes sensing a current between the electrode and the workpiece.

18. The method of claim 17, wherein the step of sensing further includes sensing a distance between the electrode and the workpiece.

19. The method of claim 18, wherein the attribute comprises at least one passage and the step of generating comprises generating the signal indicative of the characteristic of the attribute in accordance with a predetermined correspondence between characteristics of the at least one parameter of the electrical discharge machining process and characteristics of at least one passage resulting therefrom.

20. The method of claim 12, wherein the attribute comprises at least one-passage and the step of generating comprises generating the signal indicative of the characteristic of the attribute in accordance with a predetermined correspondence between characteristics of the at least one parameter of the electrical discharge machining process and characteristics of at least one passage resulting therefrom.

21. The method of claim 20, wherein the step of generating the signal indicative of the characteristic of the attribute comprises generating a signal indicative of a break-through condition for the at least one passage.

22. The method of claim 20, wherein the step of generating the signal indicative of the characteristic of the attribute comprises generating a signal indicative of an airflow measure for the at least one passage.

23. An apparatus for predicting a characteristic of an attribute of a product, said product being fabricated by a stochastic machining process, said apparatus comprising:
  a plurality of sensors for sensing a plurality of parameters associated with said stochastic machining process, said plurality of sensors generating a plurality of measurement signals indicative of said plurality of parameters; and
  a signal processor receiving said plurality of measurement signals from said plurality of sensors, said signal processor including a process model that based on information from said plurality of measurement signals predicts a characteristic of an attribute of said product.

24. The apparatus according to claim 23, wherein said apparatus predicts airflow characteristics of cooling holes of an airfoil.

25. The apparatus according to claim 23, wherein said apparatus predicts break-through characteristics of cooling holes of an airfoil.

26. The apparatus according to claim 23, wherein said stochastic machining process is an electrical discharge machining (EDM) process.

27. The apparatus according to claim 23, wherein said apparatus predicts said characteristic of said attribute prior to a defect being machined during said stochastic machining process.

28. The apparatus according to claim 23, wherein said plurality of parameters are voltage, current and displacement.

29. The apparatus according to claim 23, wherein one of said plurality of parameters is voltage.

30. The apparatus according to claim 23, wherein one of said plurality of parameters is current.

31. The apparatus according to claim 23, wherein one of said plurality of parameters is displacement.

32. The apparatus according to claim 23, wherein one of said plurality of sensors is a voltage sensor.

33. The apparatus according to claim 23, wherein one of said plurality of sensors is a current sensor.

34. The apparatus according to claim 23, wherein one of said plurality of sensors is a displacement sensor.

35. The apparatus according to claim 23, wherein said model includes at least one neural network for predicting said characteristic of said attribute.

36. The apparatus according to claim 35, wherein said neural network is a break-through neural network for predicting a break-through for cooling holes of an airfoil.

37. The apparatus according to claim 35, wherein said neural network is an airflow neural network for predicting an airflow for cooling holes of an airfoil.

38. The apparatus according to claim 23, wherein said model includes a first neural network for predicting break-through for cooling holes of an airfoil and a second neural network for predicting an airflow for said cooling holes of said airfoil.

39. The apparatus according to claim 23, wherein said model has been trained.

40. The apparatus according to claim 23, wherein said signal processor comprises:
  an input portion for conditioning said plurality of parameters and generating a plurality of conditioned signals; and
  a processing portion including a signal analyzer for analyzing said conditioned signals received from said input portion and generating analyzed signals, said analyzed signals being communicated to said model.

41. The apparatus according to claim 40, wherein said signal analyzer provides a slope signal and an intercept signal for each of said conditioned signals.

42. A method for predicting a characteristic of an attribute of a workpiece during a stochastic machining process of said workpiece, said method comprising the steps of:
  sensing at least one parameter associated with said stochastic machining process;
  communicating said at least one parameter to a model;
  processing said at least one parameter within said model; and generating a predicted characteristic of an attribute of said workpiece.

43. The method of claim 42 further comprising a preceding step of:

training said model.

44. The method of claim 42 further comprising a preceding step of:

creating said model using a plurality of data sets that represent actual stochastic machining process inputs and outputs.

45. The method of claim 42 wherein said model includes at least one neural network.

46. The method of claim 42 further comprising subsequent steps of:

determining said predicted characteristic of said attribute in real-time; and preventing potential defect from being manufactured into said workpiece.

47. The method of claim 42 further comprising an intermediate step of:

conditioning said at least one parameter prior to communicating said at least one parameter to said model.

48. The method of claim 47 further comprising an intermediate step of:

analyzing a signal subsequent conditioning said at least one parameter and prior to communicating said at least one parameter to said model.

49. The method of claim 47 further comprising an intermediate step of:

providing a slope signal and an intercept signal to said model subsequent to said step of conditioning said at least one parameter.

* * * * *